United States Patent
Yoo et al.

(10) Patent No.: US 10,085,313 B2
(45) Date of Patent: Sep. 25, 2018

(54) LIGHTING APPARATUS AND DRIVING CIRCUIT INCLUDING FREQUENCY DITHERING AND SLOPE COMPENSATION

(71) Applicant: SILICON WORKS CO., LTD., Daejeon (KR)

(72) Inventors: Tae Young Yoo, Cheongju-si (KR); Joo Wan Ha, Bucheon-si (KR); Ju Pyo Hong, Daejeon (KR); Sung Hwan Kim, Yangsan-si (KR); Hai Feng Jin, Daejeon (KR); Ju Hyun Lee, Daejeon (KR); Wanyuan Qu, Daejeon (KR); Byeong Ho Jeong, Daejeon (KR); Se Won Lee, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 15/571,903

(22) PCT Filed: Apr. 1, 2016

(86) PCT No.: PCT/KR2016/003419
§ 371 (c)(1),
(2) Date: Nov. 6, 2017

(87) PCT Pub. No.: WO2016/182206
PCT Pub. Date: Nov. 7, 2016

(65) Prior Publication Data
US 2018/0092172 A1    Mar. 29, 2018

(30) Foreign Application Priority Data

May 13, 2015 (KR) .................. 10-2015-0066964
May 13, 2015 (KR) .................. 10-2015-0066965

(51) Int. Cl.
*H05B 33/08* (2006.01)
*B60Q 1/30* (2006.01)
(Continued)

(52) U.S. Cl.
CPC ....... *H05B 33/0815* (2013.01); *H05B 33/089* (2013.01); *H05B 33/0827* (2013.01);
(Continued)

(58) Field of Classification Search
CPC . H05B 33/0815; H05B 33/0827; H05B 33/89
(Continued)

(56) References Cited

U.S. PATENT DOCUMENTS

| 2012/0299500 A1* | 11/2012 | Sadwick | H05B 33/0815 315/224 |
| 2017/0070149 A1* | 3/2017 | Guan | H02M 3/158 |
| 2017/0201181 A1* | 7/2017 | Yabuzaki | H02M 1/12 |

FOREIGN PATENT DOCUMENTS

| KR | 10-0941509 | 2/2010 |
| KR | 10-2010-0129789 | 12/2010 |

(Continued)

OTHER PUBLICATIONS

International Search Report for International Application No. PCT/KR2016/003419, dated Oct. 26, 2016.
(Continued)

*Primary Examiner* — Dylan White
(74) *Attorney, Agent, or Firm* — Kile Park Reed & Houtteman PLLC

(57) ABSTRACT

Provided is a lighting apparatus. The lighting apparatus may provide an output voltage to lighting loads, and include: a converter configured to generate the output voltage using a driving signal; and a driving circuit configured to provide the driving signal, and spread the frequency of the driving
(Continued)

signal by performing frequency dithering on the driving signal while changing the shape of an oscillation signal.

24 Claims, 17 Drawing Sheets

(51) Int. Cl.
*B60Q 1/44* (2006.01)
*B60Q 1/34* (2006.01)

(52) U.S. Cl.
CPC .................. *B60Q 1/30* (2013.01); *B60Q 1/34* (2013.01); *B60Q 1/44* (2013.01)

(58) Field of Classification Search
USPC .......................................................... 315/77
See application file for complete search history.

(56) References Cited

FOREIGN PATENT DOCUMENTS

| KR | 10-1084920 | 11/2011 |
| KR | 10-2012-0039726 | 4/2012 |
| KR | 10-2012-0105416 | 9/2012 |
| KR | 10-2015-0001490 | 1/2015 |

OTHER PUBLICATIONS

Written Opinion with English Translation for International Application No. PCT/KR2016/003419, dated Oct. 26, 2016.

\* cited by examiner

Peak Reduction

LIGHTING APPARATUS AND DRIVING CIRCUIT INCLUDING FREQUENCY DITHERING AND SLOPE COMPENSATION

BACKGROUND

1. Technical Field

The present disclosure relates to a lighting apparatus, and more particularly, to a lighting apparatus which can be used as an illumination lamp for a vehicle, such as a rear combination lamp, and a driving circuit thereof.

2. Related Art

In general, a vehicle includes lighting apparatuses for various uses, which are installed inside or outside. Examples of the lighting apparatuses may include a rear combination lamp installed at both rear sides of the vehicle.

The rear combination lamp includes a direction indicator lamp, a brake lamp, a tail lamp and a backup lamp, and is used for transferring the driving intention or driving state of an ego vehicle to a driver in another vehicle located at the rear of the ego vehicle.

Recently, a lighting apparatus using high-brightness LEDs (Light Emitting Diode) has been developed, and a rear combination lamp employing LEDs therein has been developed as a lighting apparatus for a vehicle. The rear combination lamp employing LEDs as a light source may have various designs, and the number of LEDs employed in the rear combination lamp having various designs tends to gradually increase.

The lighting apparatus for a vehicle, such as the rear combination lamp, needs to be designed to stably operate and reduce power consumption while having a small number of parts used therein.

The lighting apparatus using LEDs may be configured to provide an output voltage to a plurality of LED channels. When the number of LED channels emitting light is changed, the load of the lighting apparatus may be changed, and the output voltage of the lighting apparatus, provided to the LED channels, may be temporarily destabilized at the point of time that the load change occurs.

In response to the change of the output voltage, the lighting apparatus can compensate for the change of the output voltage by the load change and stabilize the output voltage, through compensation of the output voltage using a feedback voltage and linear regulation using a sensing signal.

However, the conventional lighting apparatus consumes a large amount of time in compensating for the change of the output voltage and stabilizing the output voltage in response to the load change. When a large amount of time is consumed in stabilizing the output voltage, the change of the output voltage may have an influence on illuminance.

Therefore, the lighting apparatus using LEDs needs to be improved to stabilize the output voltage even though a load change occurs.

Furthermore, the lighting apparatus performs power conversion using a converter including switching elements, and provides an output voltage generated as the power conversion result. The converter of the lighting apparatus may include a buck converter.

Since the converter consumes much power at a switching time for power conversion, EMI (Electro Magnetic Interference) may occur. Since the occurrence of EMI in the converter may have an influence on the operation of the lighting apparatus, the EMI must be reduced. Therefore, a converter driving technique for reducing EMI needs to be developed.

When the duty of a driving signal for driving the converter to provide an output voltage is equal to or more than 50%, unstable sub-harmonic oscillation may occur in the converter of the lighting apparatus. The unstable sub-harmonic oscillation may serve as a factor that destabilizes the operation of the lighting apparatus.

The unstable sub-harmonic oscillation of the converter may be controlled through compensation for the slope of the driving signal for driving the converter. The slope compensation for the driving signal may indicate controlling the slopes of rising and falling edges of the driving signal. The slope compensation may be performed by a slope compensation voltage obtained through a current having a fixed value.

The buck converter may have a variable range of switching frequency. For example, a variable range of 100 KHz to 1 MHz may be set. The switching frequency of the buck converter may be decided by the driving signal provided by a driving circuit. When the variable range of the switching frequency is large, the inductance value of the buck converter must be set according to the variable switching frequency. However, when the inductance value of the buck converter is varied, the value of the slope compensation voltage for controlling sub-harmonic oscillation must be changed.

As described above, the value of the slope compensation voltage may be provided based on the current having a fixed value. Therefore, the driving circuit needs to receive a voltage or current from outside, the voltage or current being used for changing the slope compensation voltage according to the variable switching frequency, and the driving circuit may additionally need a connection terminal for receiving the external current or voltage. In order to generate the voltage or current for changing the slope compensation voltage, additional circuits including many parts may be required.

Furthermore, the LED channels of the lighting apparatus are configured to emit light at different times in order to remove power concentration and EMI. Each of the LED channels must be guaranteed to maintain a predetermined amount of LED current or more, in order to normally emit light.

In order to guarantee that each of the LED channels maintains the predetermined amount of LED current or more, the lighting apparatus may detect the lowest voltage among feedback voltages of the respective LED channels as a detection voltage, compare the detection voltage to a reference voltage at a fixed level, and control an output voltage according to the comparison result. The technique for controlling an output voltage of the lighting apparatus has been described in Korean Patent Registration No. 10-0941509.

The LED channels may have different bias voltages due to a characteristic deviation therebetween. For example, when the bias voltages of the LED channels are all different, the lowest feedback voltage of the LED channels may be changed whenever the respective LED channels emit light.

Therefore, the level of the output voltage generated by the converter may be frequently changed. When the output voltage is unstably changed, audible noise corresponding to the change of the output voltage may be caused in the converter.

When the lighting apparatus includes a large number of LED channels, it is difficult for one driving circuit to handle all of the LED channels. Therefore, a plurality of driving circuits are needed to control light emissions of the LED channels. In this case, the driving circuits may be implemented with multi-chips.

When the driving circuits are implemented with multi-chips, the parts of the converter and the like need to be shared in order to reduce the manufacturing cost and the number of parts.

When the driving circuits are implemented with multi-chips corresponding to the large number of LED channels, a lighting apparatus in which the parts of the converter or the like can be shared is required in order to reduce the manufacturing cost and the number of parts.

The converter switched by the driving signal must be guaranteed to have the minimum on-time and the minimum off-time. The minimum on-time indicates the minimum time required for turning on a switch of the converter, and the minimum off-time indicates the minimum time required for turning off the switch of the converter. In general, the minimum on-time for the turn-on of the converter and the minimum off-time for the turn-off of the converter are fixed.

However, when the switching frequency of the converter is changed, it may be difficult to secure an effective duty of the driving signal for controlling dimming due to the fixed minimum on-time. More specifically, as the switching frequency of the converter becomes higher, the fixed minimum on-time gradually occupies a large portion of the turn-on period of the converter. As a result, it becomes gradually difficult to secure an effective duty of the driving signal for controlling dimming.

Also, when the switching frequency of the converter is changed, it may be difficult to secure an effective duty of the driving signal for controlling dimming due to the fixed minimum off-time. More specifically, as the switching frequency of the converter becomes higher, the fixed minimum off-time gradually occupies a large portion within one cycle of the driving signal. As a result, it becomes gradually difficult to secure an effective duty of the driving signal for controlling dimming.

Therefore, there is a demand for a method capable of securing an effective duty of the driving signal for controlling dimming of the LED lamp regardless of a change in switching frequency of the converter.

SUMMARY

Various embodiments are directed to a technique for stably maintaining an output voltage provided to lighting loads such as LEDs in response to load changes of the lighting loads, in order to stabilize an operation of a lighting apparatus.

Also, various embodiments are directed to a technique for quickly correcting an on-time of a driving signal for generating an output voltage into a preset value at load change points of lighting loads included in a lighting apparatus, thereby rapidly stabilizing and stably maintaining an output voltage in response to a load change.

Also, various embodiments are directed to a technique for reducing EMI caused during a power conversion process for generating an output voltage to provide to lighting loads of a lighting apparatus.

Also, various embodiments are directed to a technique for spreading a switching point of a converter by controlling a driving signal to have spread frequencies to which spread spectrum is applied, the driving signal being provided for power conversion of a converter in a lighting apparatus, thereby removing a concentration of power consumption at a switching point of the converter while reducing EMI.

Also, various embodiments are directed to a technique for providing a slope compensation voltage in response to a variation of a switching frequency for power conversion of a converter in a lighting apparatus, thereby controlling sub-harmonic oscillation which may occur depending on the duty state of an output voltage.

Also, various embodiments are directed to a technique for providing a slope compensation voltage corresponding to a switching frequency changed depending on a change of a current or voltage corresponding to a change of a switching frequency of an oscillation circuit to provide a PWM signal used for generating a driving signal, when the switching frequency for power conversion of a converter is varied.

Also, various embodiments are directed to a technique for simply implementing a configuration for actively handling a variation in switching frequency for power conversion of a converter through an interconnection structure of a driving circuit, without separate terminals or parts.

Also, various embodiments are directed to a technique for raising a reference voltage when a feedback voltage having the lowest level among feedback voltages corresponding to bias voltages of LED channels is lowered to a preset level or less, and stabilizing an output voltage generated by a converter using the raised reference voltage.

Also, various embodiments are directed to a technique for generating a reference voltage through a charging/discharging operation based on the lowest feedback voltage among feedback voltages corresponding to bias voltages of LED channels, and regulating an output voltage using the reference voltage, thereby stabilizing an output voltage generated by a converter.

Also, various embodiments are directed to a technique for controlling an output voltage which may be destabilized by a difference in bias voltage between LED channels, thereby removing audible noise which may occur in a converter due to an unstable output voltage.

Also, various embodiments are directed to a technique for reducing the number of parts and the manufacturing cost by sharing parts of a converter and the like when a plurality of driving circuits are installed in response to a large number of LED channels.

Also, various embodiments are directed to a technique for driving LED channels using one converter, when a plurality of driving circuits are installed in response to a plurality of LED channels.

Also, various embodiments are directed to a technique for sharing the lowest feedback voltage for LED channels corresponding to a plurality of driving circuits when the plurality of driving circuits are installed in response to a large number of LED channels, detecting the lowest feedback voltage for the whole LED channels, and controlling an output voltage to be provided to the LED channels using the lowest feedback voltage for the whole LED channels.

Also, various embodiments are directed to a technique for securing an effective duty of a driving signal for controlling dimming of an LED lamp even though a switching frequency of a converter is changed.

Also, various embodiments are directed to a technique for changing the minimum on-time in response to a change in switching frequency of a converter, thereby securing an effective duty of a driving signal for dimming control regardless of a change in switching frequency of the converter.

Also, various embodiments are directed to a technique for changing the minimum off-time in response to a change in switching frequency of a converter, thereby securing an effective duty of a driving signal for dimming control regardless of a change in switching frequency of the converter.

In an embodiment, there is provided a lighting apparatus that provides an output voltage to a lighting load. The lighting apparatus may include: a converter configured to generate the output voltage using a driving signal; and a driving circuit configured to provide the driving signal, and spread the frequency of the driving signal by performing frequency dithering on the driving signal while changing the shape of an oscillation signal.

In an embodiment, there is provided a driving circuit of a lighting apparatus, which provides a driving signal to a converter for providing an output voltage to lighting loads. The driving circuit may include: a dithering control unit configured to generate a frequency reference voltage which the waveform is changed; a filter configured to provide an oscillation signal obtained by standardizing the shape of the frequency reference voltage; and an oscillator configured to provide a frequency-dithered pulse in response to the shape of the oscillation signal. The driving circuit may spread the frequency of the driving signal in response to the frequency-dithered pulse.

In an embodiment, there is provided a driving circuit of a lighting apparatus, which provides a driving signal to a converter for providing an output voltage to illumination loads. The driving circuit may include: a frequency source configured to provide variable frequency information of the driving signal; and a slope compensator configured to generate a slope compensation voltage having a value changed depending on the frequency information. The driving circuit may provide the driving signal having a slope corresponding to the slope compensation voltage.

In an embodiment, there is provided a driving circuit of a lighting apparatus, which provides a driving signal to a converter for providing an output voltage to illumination loads. The driving circuit may include: a dependent current source having a current amount controlled in response to an output state of an oscillator that decides the frequency of the driving signal; and a charging element configured to be charged with a current provided by the dependent current source and provide a charged voltage as a slope compensation voltage. The driving circuit may provide the driving signal having a slope corresponding to the slope compensation voltage.

According to the embodiments of the present invention, the lighting apparatus can provide an output voltage to lighting loads such as LEDs, and quickly perform compensation on load changes of the lighting loads, thereby stably maintaining the output voltage.

Furthermore, the lighting apparatus can output an output voltage to lighting loads through power conversion using a driving signal, and quickly correct an on-time of the driving signal in a preset value in response to load changes of the lighting loads, thereby rapidly stabilizing the output voltage.

Furthermore, the lighting apparatus can perform power conversion for providing an output voltage using a driving signal having spread frequencies, spread a switching point of a converter for power conversion through the spread frequencies of the driving signal, remove a concentration of power consumption, and reduce EMI.

Furthermore, the lighting apparatus can control sub-harmonic oscillation which may occur depending on a state of a voltage outputted from the converter of the lighting apparatus, and provide the slope compensation voltage which is actively changed even when the switching frequency for power conversion of the converter is varied. Thus, the sub-harmonic oscillation can be effectively controlled.

Furthermore, since the driving circuit for actively handling a variation of the switching frequency for power conversion of the converter of the lighting apparatus can be simply implemented by the internal interconnection structure, the number of parts and the manufacturing cost can be reduced.

Furthermore, the lighting apparatus can change the reference voltage according to a change of the lowest feedback voltage, thereby stabilizing the output voltage generated by the converter using the changed reference voltage while removing audible noise caused by an unstable output voltage.

Furthermore, the lighting apparatus can generate the reference voltage through a charging/discharging operation based on the lowest feedback voltage, and regulate the output voltage using the reference voltage generated through the charging/discharging operation, thereby stabilizing the output voltage generated by the converter while removing audible noise caused by an unstable output voltage.

Furthermore, a plurality of driving circuits corresponding to a large number of LED channels can be installed, and parts of the converter and the like can be shared. Thus, the number of parts and the manufacturing cost can be reduced.

Furthermore, since the LED channels can be driven by one converter, the number of parts and the manufacturing cost can be reduced.

Furthermore, the lowest feedback voltage for the LED channels corresponding to the respective driving circuits can be shared and used to control the output voltage provided to the LED channels.

Furthermore, since the corrected minimum on-time or minimum off-time can be applied even though the switching frequency of the converter is changed, the lighting apparatus can secure an effective duty for controlling dimming of an LED lamp.

Furthermore, the lighting apparatus can correct the minimum on-time in response to a switching frequency change of the converter. Thus, even when the switching frequency of the converter is changed, the lighting apparatus can switch the converter while securing an effective duty.

Furthermore, the lighting apparatus can correct the minimum off-time in response to a switching frequency change of the converter. Thus, even when the switching frequency of the converter is changed, the lighting apparatus can switch the converter while securing an effective duty.

DETAILED DESCRIPTION

Figure 1:
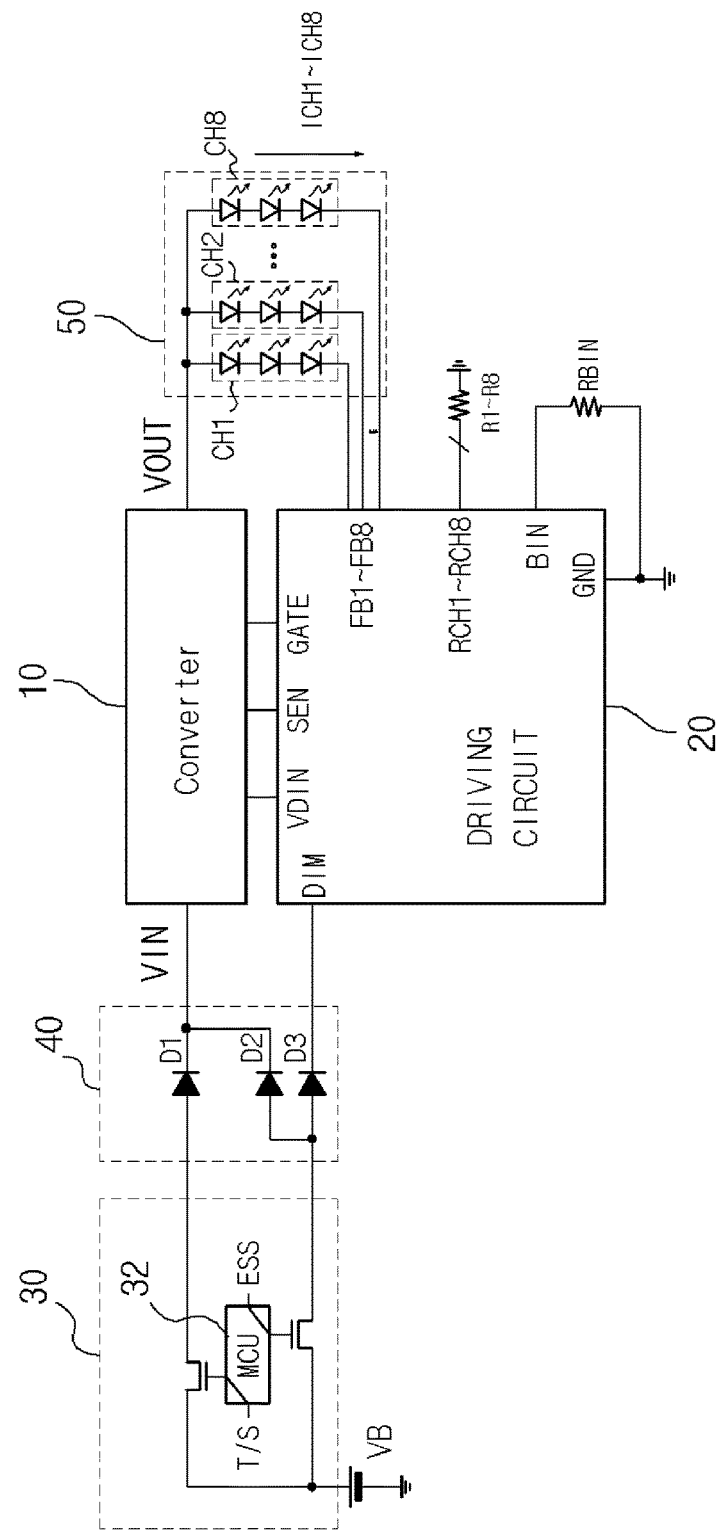
FIG. 1 is a diagram for describing a lighting apparatus according to various embodiments of the present invention.

Hereafter, embodiments of the present invention will be described in detail with reference to the accompanying drawings. The terms used in the present specification and claims are not limited to typical dictionary definitions, but must be interpreted into meanings and concepts which coincide with the technical idea of the present invention.

Embodiments described in the present specification and configurations illustrated in the drawings are preferred embodiments of the present invention, and do not represent the entire technical idea of the present invention. Thus, various equivalents and modifications capable of replacing the embodiments and configurations may be provided at the point of time that the present application is filed.

FIG. 1 is a diagram for describing various embodiments of the present invention. Referring to FIG. 1, the lighting apparatus includes a converter 10 and a driving circuit 20. The lighting apparatus may include a vehicle control unit 30, a path unit 40 and an LED lamp 50. In the above-described configuration, the driving circuit 20 may be implemented as one chip.

The LED lamp 50 may be configured using an LED lamp for a vehicle. For example, a rear combination lamp installed at both rear sides of the vehicle may be applied as the LED lamp 50. The LED lamp 50 is an example of a light source used as a load, and a light source using various types of optical elements may be used as the load.

The LED lamp 50 may include a plurality of LED channels CH1 to CH8, each of the LED channels CH1 to CH8 may include one or more LEDs, and the plurality of LED channels CH1 to CH8 may be configured in parallel to each other.

FIG. 1 illustrates that one driving circuit 20 drives the plurality of LED channels CH1 to CH8 included in the LED lamp 50. When the LED lamp 50 is a rear combination lamp, the LED lamp 50 may be divided into a type in which LED channels are installed only in the vehicle body and a type in which LED channels are distributed and installed in the vehicle body and the door of the trunk, depending on vehicle models. The LED lamp 50 of FIG. 1 may not be limited to a specific type, but defined as including LED channels configured in various types. Currents of the respective channels CH1 to CH8 are represented by ICH1 to ICH8.

The vehicle control unit 30 may include a micro controller unit (MCU) 32, and the MCU 32 may be understood as a main MCU for providing various control signals required for driving the vehicle or an auxiliary MCU for subsidiarily providing a control signal to perform a part of functions required for driving the vehicle while communicating with the main MCU.

The vehicle control unit 30 of FIG. 1 controls the path unit 40 to transmit a battery voltage VB to the converter 10 in response to a turn signal T/S of the MCU 32, or controls the path unit 40 to transmit the battery voltage VB to the converter 10 and the driving circuit 20 in response to an emergency stop signal ESS. At this time, a constant voltage source may be applied as the battery voltage VB, and the battery voltage VB may be replaced with various constant voltage sources. The battery voltage transmitted to the driving circuit 20 in response to the emergency stop signal ESS may be defined as a dim signal DIM. The turn signal T/S and the emergency stop signal ESS may be included in the control signals provided by the MCU 32. However, the present invention is not limited thereto. Depending on a designer's intention, the vehicle control unit 30 may be configured to provide voltages corresponding to various control signals for driving the LED lamp 50 to one or more of the converter 10 and the driving circuit 20.

The path unit 40 may be configured between the vehicle control unit 30 and the converter 10 and the driving circuit 20. The path unit 40 includes paths through which the battery voltage VB is provided to the converter 10 and the driving circuit 20, and the paths are expressed as diodes, for example.

More specifically, the path unit 40 includes paths D1 and D2 through which the battery voltage VB is transmitted to the converter 10 and a path D3 through which the dim signal DIM is transmitted to the driving circuit 20. When the turn signal T/S is enabled, the battery voltage VB is transmitted to the converter 10 through the path D1. When the emergency stop signal ESS is enabled, the battery voltage VB is transmitted to the converter 10 through the path D2, and transmitted as the dim signal DIM to the driving circuit 20 through the path D3. In response to the enabled emergency stop signal ESS, the enabled dim signal DIM is inputted to the driving circuit 20. For example, the path D3 may include a circuit for outputting the dim signal DIM having a logic level corresponding to the battery voltage VB. The battery voltage VB transmitted to the converter 10 through the path unit 40 may be defined as an input voltage VIN.

The converter 10 generates an output voltage VOUT and an internal voltage VDIN using the input voltage VIN, supplies the output voltage VOUT to the LED lamp 50, and supplies the internal voltage VDIN to the driving circuit 20.

For example, the converter 10 may include various power conversion circuits such as a buck converter and flyback converter.

The driving circuit 20 may be configured to perform sensing and control on the converter 10 and the LED lamp 50.

The driving circuit 20 may receive the internal voltage VDIN and the sensing signal SEN from the converter 10, and provide a driving signal GATE to the converter 10. The internal voltage VDIN is used for the operation of the control unit 30, the sensing signal SEN is used for determining the level of the input voltage VIN or directly or indirectly sensing the operation state of the converter 10 or the state of the output voltage VOUT, and the driving signal GATE is used for a switching operation for power conversion of the converter 10. The driving signal GATE may be provided as a pulse width modulation (PWM) signal.

The driving circuit 20 may receive feedback voltages FB1 to FB8 of the LED channels CH1 to CH8 of the LED lamp 50, regulation voltages RCH1 to RCH8 applied to regulation resistors R1 to R8 for linear regulation of the LED channels CH1 to CH8, and a bin voltage BIN applied to a bin resistor RBIN for controlling dimming of the whole LED channels CH1 to CH8 of the LED lamp 50.

The bin resistor RBIN may be defined as a load current control resistor acting on the whole LED channels CH1 to CH8 serving as loads, and the bin voltage BIN applied to the bin resistor RBIN may be used for determining a load change point, and defined as a load current control voltage.

More specifically, the LED channels CH1 to CH8 may be configured to emit light at different times in order to distribute the load, and the bin voltage BIN of the bin resistor RBIN may be changed at a point of time that each of the LED channels CH1 to CH8 emits light. For example, when one LED channel emits light, the bin voltage BIN may be higher than when all of the LED channels are turned off. Furthermore, when two LED channels emit light, the bin voltage BIN may be higher than when one LED channel emits light. The point of time that the bin voltage BIN is changed may be defined as the load change point.

As a result, the driving circuit 20 may determine the load change point using the bin voltage BIN, and generate a control voltage $V_N$ corresponding to the load after the load change point. The control voltage $V_N$ may be generated in response to a preset value, and will be described in detail with reference to a control voltage providing circuit 230.

According to the configuration of FIG. 1, the converter 10 provides the output voltage VOUT to the LED channels CH1 to CH8 serving as loads, using the driving signal GATE.

Hereafter, the configurations of the converter 10 and the driving circuit 20 according to the embodiment of the present invention will be described in detail with reference to FIG. 2.

The converter 10 includes a switching element Qb, the input voltage VIN is transmitted to the switching element Qb through a resistor Rb, and a voltage across the resistor Rb is sensed by an amplifier 110 and outputted as a sensing signal SEN. The switching element Qb may include an NMOS transistor, and an FET may be used as the switching element Qb. Furthermore, an inductor Lb and a capacitor Cb are connected in series to the switching element Qb, and a diode Db is connected in parallel between the switching element Qb and the inductor Lb, and configured to pass a current in the reverse direction of a current flow provided from the switching element Qb.

The converter 10 may perform power conversion through periodic turn-on/off of the switching element Qb, and the turn-on/off of the switching element Qb may be decided by the driving signal GATE.

When the switching element Qb is turned on, a current loop including the switching element Qb, the inductor Lb and the capacitor Cb is formed, and a current flows into the inductor Lb to store energy. The current flows while being increased through the capacitor Cb. At this time, the LED channels CH1 to CH8 serving as loads are connected in parallel to the capacitor Cb, and receive the increasing current, like the capacitor Cb.

When the switching element Qb is turned off, a current loop including the diode Db, the inductor Lb and the capacitor Cb is formed, and an inductor current corresponding to the energy stored in the inductor Lb is supplied to the capacitor Cb. At this time, the inductor current gradually decreases after the switching element Qb is turned off, and the LED channels CH1 to CH8 connected in parallel to the capacitor Cb also receive the gradually decreasing current.

In the converter 10, the voltage stored in the capacitor Cb is outputted as the output voltage VOUT, and the output voltage VOUT equal to the voltage applied to the LED channels LED1 to LED8.

The driving circuit 20 provides the control voltage $V_N$ corresponding to the load which is changed at each of the load change points of the LED channels CH1 to CH8, generates an adjusting voltage $V_{NC}$ using the control voltage $V_N$, and provides the driving signal GATE which has an on-time corresponding to the adjusting voltage $V_{NC}$ through compensation for the load change. The driving circuit 20 may generate a detection voltage $V_D$ corresponding to the minimum voltage among the feedback voltages FB1 to FB8 of the LED channels CH1 to CH8, and generate a compensation voltage $V_c$ corresponding to the detection voltage $V_D$. The driving circuit 20 may generate the adjusting voltage $V_{NC}$ by adding the compensation voltage $V_c$ to the control voltage $V_N$.

The feedback voltages FB1 to FB8 are applied to linear regulators 201 to 208. The driving circuit 20 includes the linear regulators 201 to 208, and receives the feedback voltages FB1 to FB8 to monitor whether the output voltage VOUT is retained at the minimum voltage or more at which the LED channels CH1 to CH8 normally maintain illumination, and the received feedback voltages FB1 to FB8 are provided to a detection voltage generation circuit 220 in the driving circuit 20.

The linear regulators 201 to 208 are configured between regulation resistors R1 to R8 and the LED channels CH1 to CH8, respectively. The linear regulator 201 includes a comparator 211 and an NMOS transistor M1. The comparator 211 compares a regulation voltage RCH11 applied to the regulation resistor R1 to a preset reference voltage VREF1, and the NMOS transistor M1 controls a current flowing between the LED channel LED1 and the regulation resistor R1 in response to a voltage outputted from the comparator 211. The linear regulators 202 to 208 include comparators 212 to 218 and NMOS transistors M2 to M8, respectively, like the linear regulator 201.

The linear regulators 201 to 208 perform a linear regulation operation for controlling a current flowing through the LED channels CH1 to CH8 in response to comparison results between the regulation voltages RCH1 to RCH8 and the reference voltage VREF1. Through the linear regulation operation, the current amounts of the LED channels CH1 to CH8 may be limited by the reference voltage VREF1.

Figure 2:
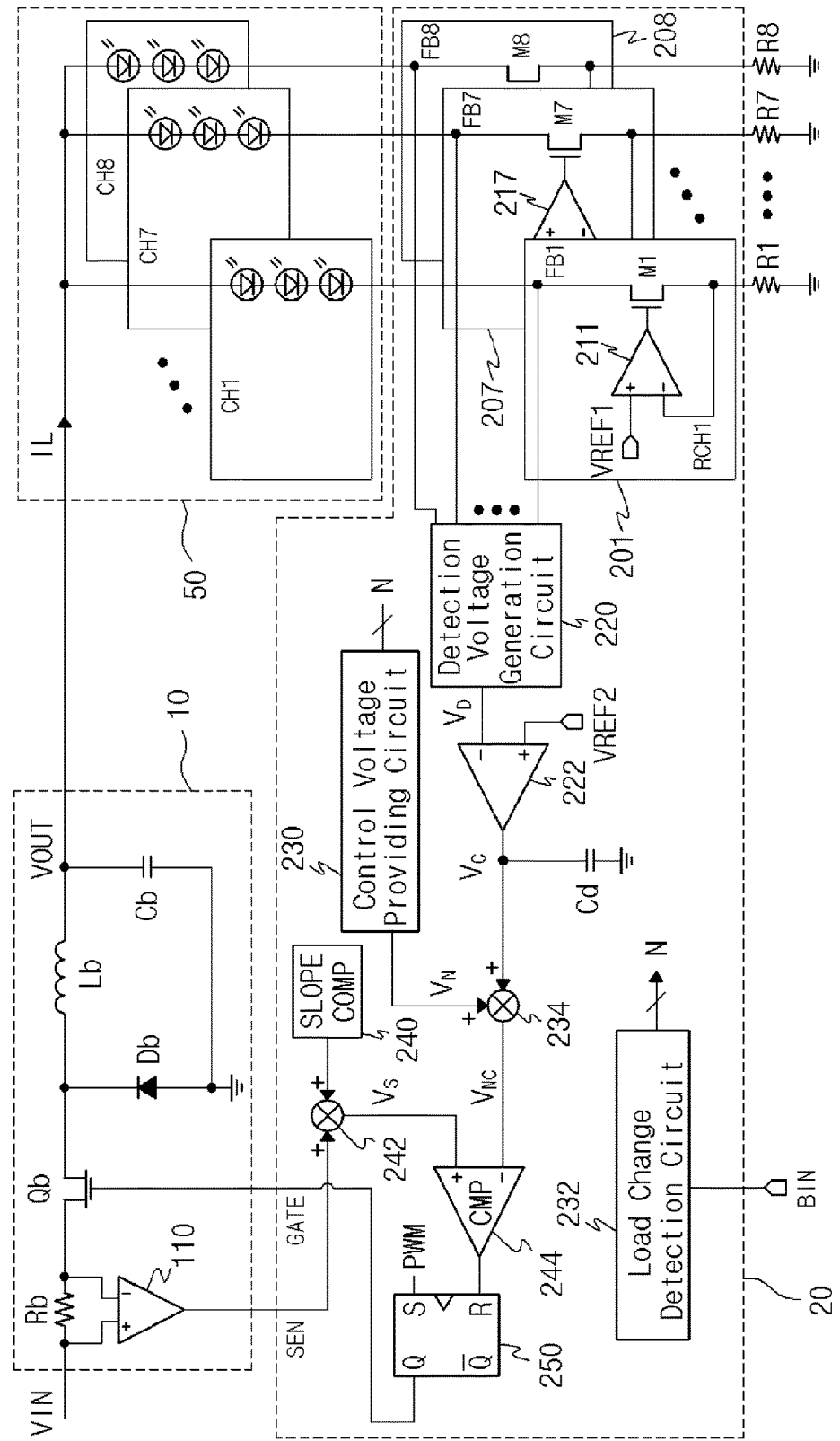
FIG. 2 is a detailed circuit diagram illustrating a first embodiment of the present invention, corresponding to FIG. 1.

In FIG. 1 or 2, the LED channels CH1 to CH8, the linear regulators 201 to 208, the comparators 211 to 218, the NMOS transistors M1 to M8, the regulation resistors R1 to R8, the regulation voltages RCH1 to RCH8 and the feedback voltages FB1 to FB8 are partially omitted for convenience of description.

The driving circuit 20 further includes a detection voltage generation circuit 220, a control voltage providing circuit 230, a load change detection circuit 232 and a driving signal providing circuit, in addition to the linear regulators 201 to 208.

The detection voltage generation circuit 220 detects a feedback voltage having the minimum value among the feedback voltages FB1 to FB8, and provides the feedback voltage having the minimum value as the detection voltage $V_D$.

The load change detection circuit 232 detects a load change point using the bin voltage BIN. The load change detection circuit 232 may not only detect the load change point, but also provide a digital value N to the control voltage providing circuit 230, the digital value N corresponding to the load after the load change point that the bin voltage BIN is changed.

The level of the bin voltage BIN may be changed at the load change point that the number of LED channels CH1 to CH8 emitting light is changed. For example, the load change detection circuit 232 may output a binary code of "0000" when all of the LED channels CH1 to CH8 are turned off, increase the digital value N expressed as a binary code by one bit whenever the number of LED channels emitting light is increased, and decrease the digital value N by one bit whenever the number of LED channels CH1 to CH8 emitting light is decreased.

In other words, when the number of LED channels CH1 to CH8 emitting light is increased, the load change detection circuit 232 may sequentially increase the digital value N to $(0000)_2$, $(0001)_2$, $(0010)_2$, $(0011)_2$, $(0100)_2$, $(0101)_2$, $(0110)_2$, $(0111)_2$ and $(1000)_2$. On the contrary, when the number of LED channels CH1 to CH8 emitting light is decreased, the load change detection circuit 232 may sequentially decrease the digital value N to $(1000)_2$, $(0111)_2$, $(0110)_2$, $(0101)_2$, $(0100)_2$, $(0011)_2$, $(0010)_2$, $(0001)_2$ and $(0000)_2$.

For example, when one of the LED channels CH1 to CH8 which have been turned off is turned on to emit light, the load change detection circuit 232 senses a load change point based on a change of the bin voltage BIN. When the digital value N corresponding to the state in which the LED channels CH1 to CH8 are all turned off is $(0000)_2$ and the digital value N corresponding to the state in which one of the LED channels CH1 to CH8 emits light is $(0001)_2$, the load change detection circuit 232 changes the digital value N to $(0001)_2$ from $(0000)_2$, and outputs the changed digital value N.

The control voltage providing circuit 230 outputs the control voltage $V_N$ corresponding to the digital value N. When the digital value N is increased, the control voltage providing circuit 230 outputs the control voltage $V_N$ of which the level is increased, and when the digital value N is decreased, the control voltage providing circuit 230 outputs the control voltage $V_N$ of which the level is decreased. For example, when the digital value N is $(0001)_2$, the control voltage providing circuit 230 outputs the control voltage $V_N$ at a higher level than when the digital value N is $(0000)_2$. As described above, the control voltage $V_N$ may be decided by the digital value N inputted to the control voltage providing circuit 230, and the control voltage providing circuit 230 may include a digital-analog converter to output the control voltage $V_N$ corresponding to the digital value N.

The driving signal providing circuit generates the compensation voltage $V_c$ corresponding to the detection voltage $V_D$, generates the adjusting voltage $V_{NC}$ by summing up the control voltage $V_N$ and the compensation voltage $V_c$, and generates the driving signal GATE using a comparison result between the adjusting voltage $V_{NC}$ and the comparison voltage $V_s$ as a reset signal. The comparison voltage $V_s$ corresponds to the sum of the sensing signal SEN provided from the converter 10 and a slope compensation voltage provided from a slope compensator 240. When it is assumed that the comparison voltage $V_s$ has a fixed value, the driving signal GATE has an on-time corresponding to the adjusting voltage $V_{NC}$.

For this configuration, the driving signal providing circuit may include a comparator 222, a summer 234, a slope compensator 240, a comparator 244 and an SR latch 250. The SR latch 250 may be implemented with a pulse generator for generating a gate signal, and include an SR flip-flop.

The comparator 222 compares a detection voltage $V_{D0}$ outputted from the detection voltage generation circuit 220 to a reference voltage VREF2 having a preset level, and outputs the compensation voltage $V_c$. At this time, the compensation voltage $V_c$ may be stabilized by the capacitor Cd connected to an output terminal of the comparator 222. In the present embodiment, the comparator 222 is configured to receive the detection voltage $V_{D0}$ through a negative terminal (−) thereof, and receive the reference voltage VREf2 through a positive terminal (+) thereof.

The summer 234 generates the adjusting voltage $V_{NC}$ by summing up the control voltage $V_N$ provided from the control voltage providing circuit 230 and the compensation voltage $V_c$ outputted from the comparator 222, and outputs the adjusting voltage $V_{NC}$ to a negative terminal (−) of the comparator 244.

In the present embodiment, the driving signal providing circuit may include the slope compensator 240, and the slope compensator 240 may output a slope compensation voltage for compensating for the slope of a rising edge of the driving signal GATE, when the slope needs to be adjusted.

The summer 242 sums up the slope compensation voltage of the slope compensator 240 and the sensing signal SEN outputted from the converter 10, and outputs the sum result as the comparison voltage $V_s$.

The comparator 244 outputs a comparison result between the comparison voltage $V_s$ and the adjusting voltage $V_{NC}$. In the present embodiment, the comparator 244 is configured to receive the comparison voltage $V_s$ through a positive terminal (+) thereof, and receive the adjusting voltage $V_{NC}$ through a negative terminal (−) thereof. Through the configuration of the comparator 244 and the summer 242, the driving signal GATE may have a waveform into which the slope compensation voltage of the slope compensator 240 and the sensing signal SEN of the converter 10 are reflected, and the on-time may be decided by the adjusting voltage $V_{NC}$.

The SR latch 250 receives a PWM signal containing periodic pulses through a set terminal S, and receives the output of the comparator 244 through a reset terminal R. The SR latch 250 outputs the driving signal GATE through an output terminal Q, and the driving signal GATE is applied to the gate of the switching element Qb. The PWM signal may be provided to an oscillation circuit such as an oscillator (not illustrated), and the oscillation circuit may be installed inside or outside the driving circuit 20. Through the configuration of the SR latch 250, the output of the comparator 244 serves as a reset signal for deciding the on-time of the driving signal GATE. That is, the SR latch 250 may be reset by the output of the comparator 244, decide the on-time at which the gate driving signal GATE is outputted to the output terminal Q, and output the PWM signal containing periodic pulses as the driving signal GATE through the output terminal Q after the on-time.

Figure 3:
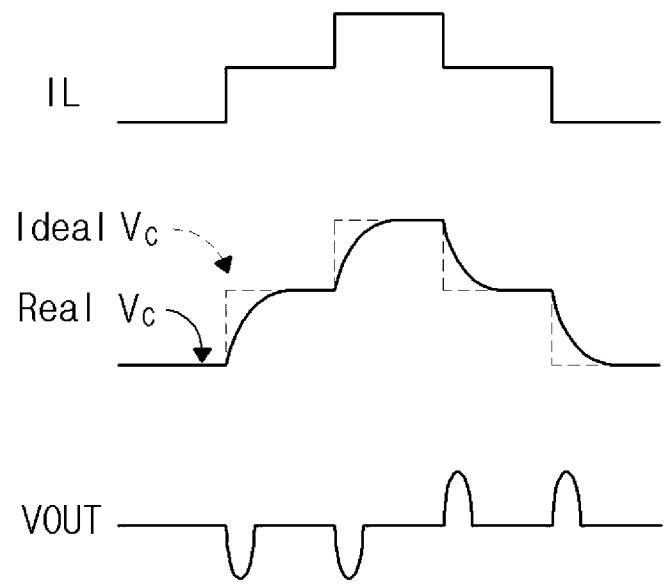
FIG. 3 is a waveform diagram for describing an operation of a conventional lighting apparatus.

In the present embodiment, when the control voltage providing circuit 230 is not installed, the correlation among the output current IL, the output voltage VOUT and the compensation voltage $V_c$ may be described as illustrated in FIG. 3. In FIG. 3, Real $V_c$ represents a change of the compensation voltage $V_c$, and Ideal $V_c$ represents the ideal compensation voltage $V_c$ corresponding to a load change.

That is, when the number of LED channels emitting light is increased in the LED lamp 50, the output voltage VOUT is temporarily lowered by the load increase. When the output voltage VOUT is lowered, the feedback voltages FB1 to FB8 are also lowered, and the detection voltage $V_D$ outputted from the detection voltage generation circuit 220 is also lowered.

The comparator 222 outputs the compensation voltage $V_c$ having a level that rises in proportion to an increase in difference between the reference voltage VREF2 and the detection voltage $V_D$, and the on-time of the driving signal GATE outputted from the SR latch 250 is advanced by the compensation voltage $V_c$. When the on-time of the driving signal GATE is advanced, the level of the output voltage VOUT from the converter 10 rises.

When the compensation for the output voltage VOUT is performed, the decreases of the feedback voltages FB1 to FB8 and the detection voltage $V_D$ are reduced, and the compensation voltage $V_c$ is gradually increased. Thus, the output voltage VOUT may return to the normal level after a predetermined time.

On the other hand, when the number of LED channels emitting light is decreased in the LED lamp 50, the output voltage VOUT is temporarily raised by the load decrease. The temporary rise of the output voltage VOUT by the load decrease is gradually compensated for, because the compensation voltage $V_c$ is gradually decreased by the increases of the feedback voltages FB1 to FB8 and the detection voltage $V_D$, and the output voltage VOUT may return to the normal level.

However, since the compensation for the output voltage VOUT by the compensation voltage $V_c$ is slowly performed in response to the load change, the output voltage VOUT may not be stably retained.

Furthermore, when the output voltage VOUT is excessively lowered, it may be difficult to guarantee the minimum voltage at which the LED channels CH1 to CH8 can stably maintain light emission. In this case, the illumination state may not be stably maintained.

Figure 4:
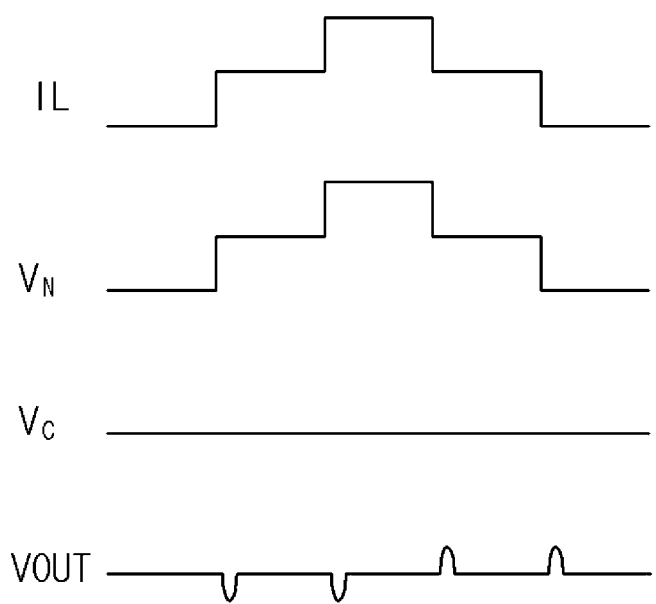
FIG. 4 is a waveform diagram for describing an operation of the first embodiment of FIG. 2.

In the present embodiment, although the load is changed by the operation of the control voltage providing circuit 230, the output voltage VOUT can be stably retained. The correlation among the output current IL, the control voltage $V_N$, the compensation voltage $V_c$ and the output voltage VOUT according to the embodiment of the present invention may be described with reference to FIG. 4.

When the number of LED channels emitting light is increased in the LED lamp 50, the load change detection circuit 232 provides the digital value N corresponding to the increased load to the control voltage providing circuit 230 at the load change point, and the control voltage providing circuit 230 provides the control voltage $V_N$ having an raised level corresponding to the increased load from the load change point. The adjusting voltage $V_{NC}$ is raised by the change of the control voltage $V_N$ from the load change point, and the SR latch 250 outputs the driving signal GATE having an on-time that is changed by the adjusting voltage $V_{NC}$ to stably retain the output voltage VOUT from the load change point.

On the other hand, when the number of LED channels emitting light is decreased in the LED lamp 50, the load change detection circuit 232 provides the digital value N corresponding to the decreased load to the control voltage providing circuit 230 at the load change point, and the control voltage providing circuit 230 provides the control voltage $V_N$ having a lowered level corresponding to the decreased load from the load change point. The adjusting voltage $V_{NC}$ is also lowered by the change of the control voltage $V_N$ from the load change point, and the SR latch 250 outputs the driving signal GATE having an on-time that is changed by the adjusting voltage $V_{NC}$ to stably retain the output voltage VOUT from the load change point.

In the present embodiment, the adjusting voltage $V_{NC}$ follows the change of the control voltage $V_N$. That is, the adjusting voltage $V_{NC}$ is quickly decided by the control voltage $V_N$ corresponding to the digital value N which is decided according to a load change, instead of the compensation voltage $V_c$ which is slowly changed in response to the load change. Therefore, since the present embodiment can quickly compensate for the output voltage VOUT in response to the load change point, the output voltage VOUT can be stably retained. As the output voltage VOUT is stably retained, the feedback voltages FB1 to FB8 are stabilized. As a result, the compensation voltage $V_c$ has a waveform to retain a constant level without a change.

Therefore, the present embodiment can stably retain the output voltage VOUT by quickly performing compensation in response to a load change of the loads, and maintain a satisfactory illumination state.

In the present embodiment, the driving signal GATE is generated through the PWM signal containing periodic pulses. When the driving signal GATE contains pulses having a fixed frequency due to the PWM signal having a constant frequency, the converter 10 of the lighting apparatus may not only consume a large amount of power at a switching point by the driving signal GATE, but also cause EMI.

In order to reduce the EMI, the present invention discloses an embodiment which is capable of changing the frequency of the PWM signal used for generating the driving signal GATE in accordance with time, through a spread spectrum technique. In the present embodiment, the driving signal GATE may have pulses at spread frequencies. Through the frequency-spread pulses of the driving signal GATE, the converter 10 may perform power conversion at spread switching points, and the spread switching points can distribute power consumption while reducing EMI.

Figure 5:
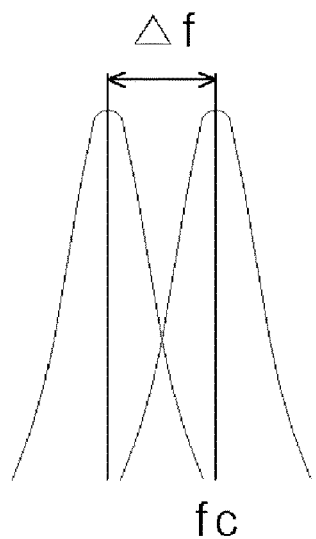
FIG. 5 is a waveform diagram illustrating that a center frequency Fc of a driving signal is varied.
Figure 6:
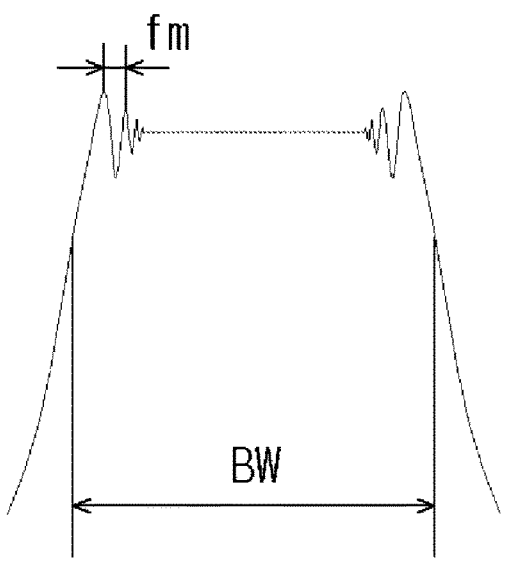
FIG. 6 is a waveform diagram illustrating the bandwidth of a frequency-modulated waveform of the driving signal.

The frequency of the PWM signal may be spread according to the Carson's rule. FIG. 5 illustrates that the center frequency fc is varied with time in a predetermined variable frequency range according to the Carson's rule. FIG. 6 illustrates the bandwidth of a frequency-modulated waveform by the Carson's rule. In FIG. 6, the modulated frequency of the variable frequency f is represented by "fm".

The spread spectrum may be implemented by "center frequency fc±variable frequency f" or "center frequency fc−variable frequency f". In the present embodiment, the spread spectrum may be implemented by "center frequency fc±variable frequency f".

The variable frequency f may be adjusted through option information. For example, the variation of the variable frequency f may be adjusted to non-dithering, 5%, 10%, 20% or 30%. The non-dithering indicates maintaining the original frequency, and the option information indicates a value that is set to change the resistance value of a dithering resistor Rf described later.

The modulated frequency fm of the variable frequency f may be obtained by changing a frequency reference voltage FREF, and the frequency reference voltage FREF may be varied to 5 msec, 10 msec or 40 msec through a digital control method. The digital control method indicates that a step control unit 304 described later is controlled by a dithering control signal DMOD.

Figure 7:
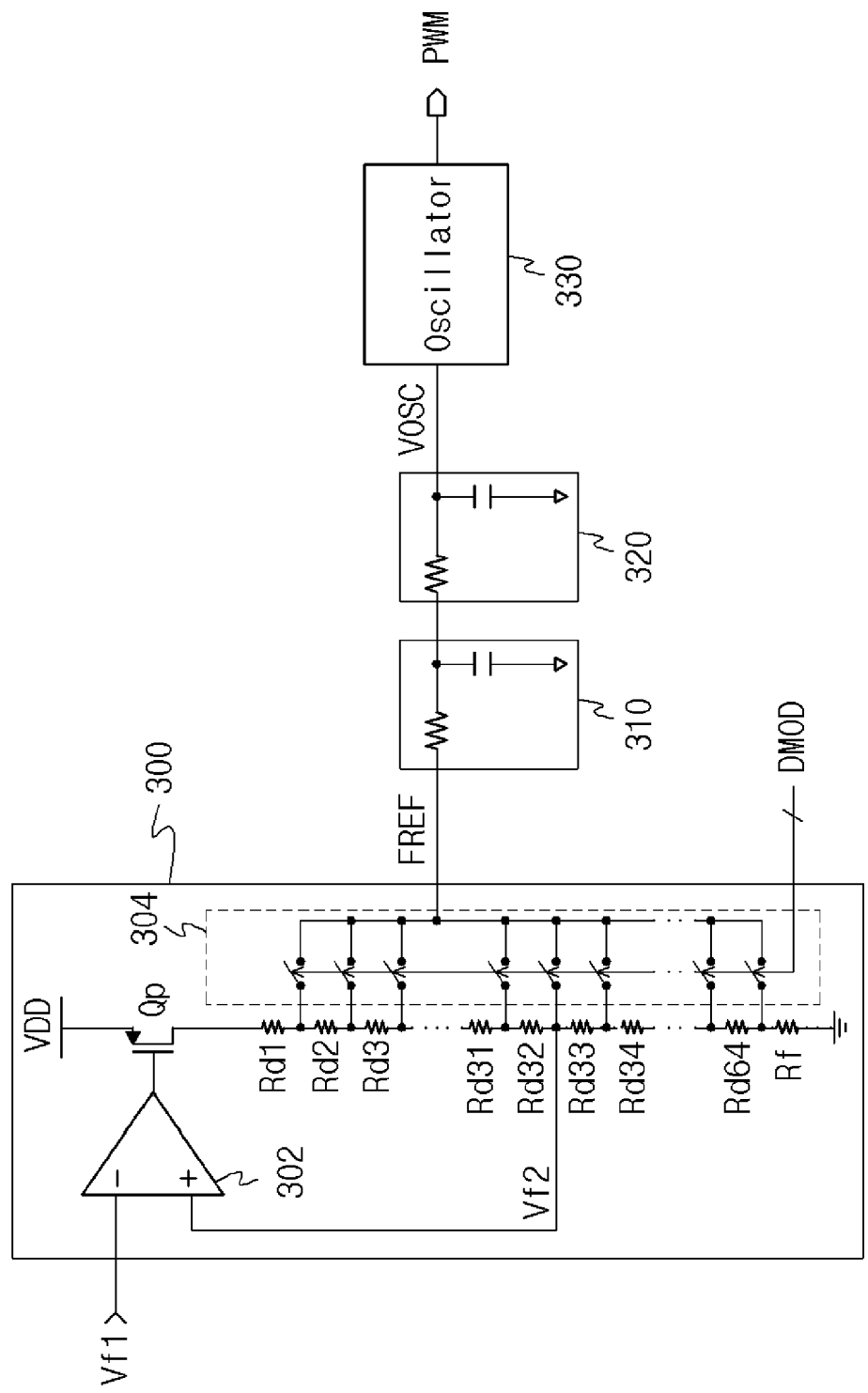
FIG. 7 is a circuit diagram illustrating a second embodiment of the present invention.

When the spread spectrum is applied, the frequency of pulses contained in the driving signal GATE may be changed with time. FIG. 7 illustrates an embodiment for this configuration.

Referring to FIG. 7, the present embodiment may include a dithering controller 300, filters 310 and 320 and an oscillator 330.

The dithering controller 300 has a configuration for varying the frequency reference voltage FREF through 64 steps, for example, and includes the dithering resistor Rf having a resistance value changed by the option information and the step control unit 304 for changing the frequency reference voltage FREF according to the dithering control signal DMOD. The dithering controller 300 further includes a comparator 302, a PMOS transistor Qp and a resistor string.

The resistor string includes resistors Rd1 to Rd64 connected in series and corresponding to the respective 64 steps and a dithering resistor Rf connected in series to the resistors Rd1 to Rd64. The dithering resistor Rf located at an end of the resistor string may be grounded, and include a variable resistor of which the resistance value can be changed in response to the option information. The resistors Rd1 to Rd64 are divided into a lower resistor group Rd1 to Rd32 having 32 steps and an upper resistor group Rd33 to Rd64 having 32 steps.

The comparator 302 outputs a voltage corresponding to a comparison result between voltages Vf1 and Vf2, and the PMOS transistor Qp is driven by the voltage outputted from the comparator 302 and transmits a driving voltage VDD to the resistor string. The voltage Vf1 inputted to the negative terminal (−) of the comparator 302 may be provided at a fixed level. Furthermore, a voltage applied to a node between the lower resistor group Rd1 to Rd32 and the upper resistor group Rd33 to Rd64 may be used as the voltage Vf2 inputted to the positive terminal (+) of the comparator 302.

The step control unit 304 includes switches connected to nodes among the resistors Rd1 to Rd64 of the resistor string, respectively. The number of the switches included in the step control unit 304 is equal to the number of the resistors Rd1 to Rd64. The switches are individually controlled by the dithering control signal DMOD having a digital value, and the dithering control signal DMOD contains bits which can be allocated to the respective switches.

In the step control unit 304, one ends of the switches are connected to the respective nodes among the resistors Rd1 to Rd64 of the resistor string, and the other ends of the switches are connected in common to form an output terminal of the dithering controller 300 which outputs the frequency reference voltage FREF.

The dithering controller 300 may be understood as including a digital-analog converter that provides the frequency reference voltage expressed as an analog value in response to the dithering control signal DMOD having a digital value.

The step control unit 304 sequentially turns on the switches connected to the lower resistor group Rd1 to Rd32. As a result, the frequency reference voltage FREF rises in a stepwise manner from the lowest level to the highest level. Then, the step control unit 304 sequentially turns on the switches connected to the upper resistor group Rd33 to Rd64. As a result, the frequency reference voltage FREF falls in a stepwise manner from the highest level to the lowest level. According to the control of the step control unit 304, the frequency reference voltage FREF has a triangular waveform in which 32-step rising sections and 32-step falling sections are formed.

The cycle of the frequency reference voltage FREF may be controlled by adjusting the 64-step switching cycle of the step control unit 304. That is, when the cycle on which the dithering control signal DMOD is provided is varied, the cycle of the frequency reference voltage FREF may be varied. In the present embodiment, the cycle of the frequency reference voltage FREF may be varied on a cycle basis.

Furthermore, the cycle of the frequency reference voltage FREF may also be controlled by adjusting a voltage change at each step. The voltage change at each step may be adjusted in response to the option information provided to the dithering resistor Rf.

The sum of height changes of the respective steps depending on changes in resistance value of the dithering resistor Rf is expressed as a height change of the triangular waveform of the frequency reference voltage FREF. Therefore, the height of the triangular waveform of the frequency reference voltage FREF may be controlled by the resistance value of the dithering resistor Rf, which is varied by the option information.

More specifically, when the height of the triangular waveform of the frequency reference voltage FREF is increased, a time required for the frequency reference voltage FREF to rise from the lowest level to the highest level or fall from the highest level to the lowest level may be increased. That is, the cycle of the frequency reference voltage FREF may be lengthened. On the other hand, when the height of the triangular waveform of the frequency reference voltage FREF is decreased, the time required for the frequency reference voltage FREF to rise from the lowest level to the highest level or fall from the highest level to the lowest level may be decreased. That is, the cycle of the frequency reference voltage FREF may be shortened.

The step control unit 304 according to the present embodiment may change the shape of the frequency reference voltage FREF.

As described above, the triangular-waveform frequency reference voltage FREF outputted from the dithering controller 300 is applied to the filter 310, and the steps of the frequency reference voltage FREF may be reduced by the operation of the filter 310 including a resistor and capacitor connected in parallel to each other.

The frequency reference voltage FREF is applied to the filter 320 through the filter 310, and the filter 320 applies an oscillation signal VOSC standardized in a triangular waveform to the oscillator 330.

The oscillator 330 may compare the triangular-waveform oscillation signal VOSC to an internal reference voltage (not illustrated), and output a PWM signal having a periodic pulse waveform.

The embodiment of FIG. 7 may be applied to the driving circuit 20, and the frequency of the PMW signal may be changed according to a shape change of the oscillation signal Vosc. When the oscillation signal Vosc is changed at each cycle, the oscillator 330 provides the PWM signal having spread frequencies at each cycle. Therefore, the driving circuit 20 may provide the driving signal GATE to the converter 10, the driving signal GATE having pulses of which the frequencies are spread by frequency dithering. Thus, the converter 10 may perform switching for power conversion at time points spread by the frequency-dithered driving signal Gate. As a result, a concentration of power consumption can be removed while EMI is reduced.

Figure 8:
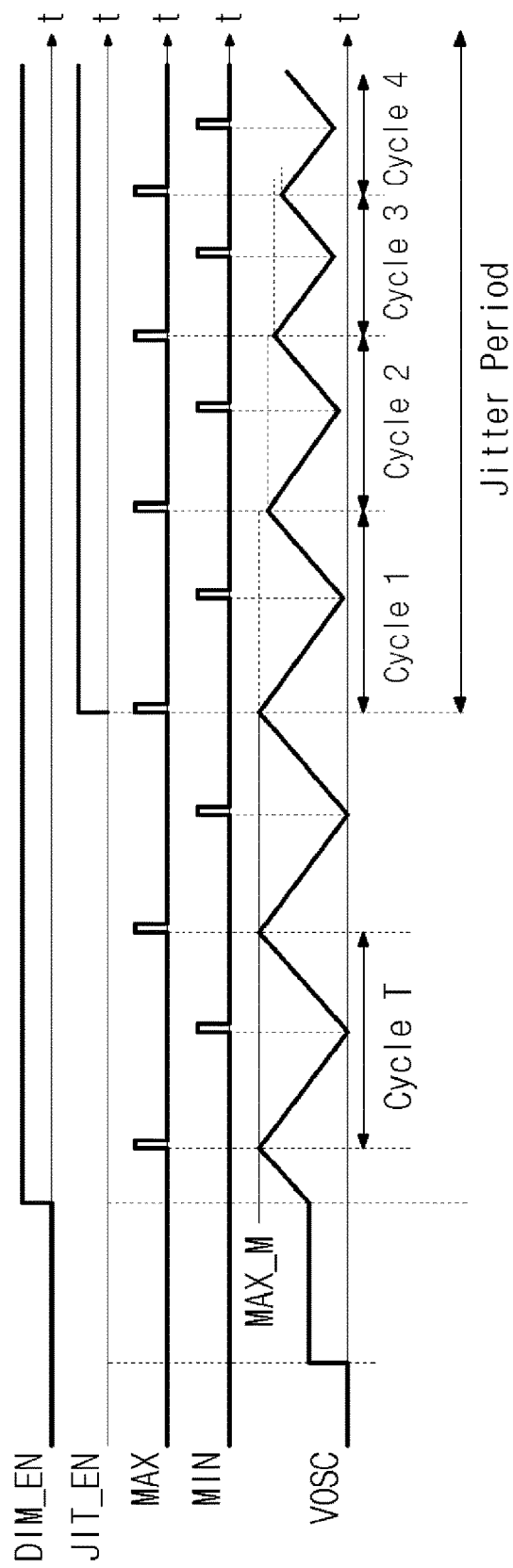
FIG. 8 is a timing diagram illustrating that a PWM signal is controlled by the embodiment of FIG. 7.

In FIG. 8, DIM_EN represents a dimming control enable signal of the lighting apparatus, JIT_EN represents a frequency dithering enable signal, and MAX and MIN represent signals for controlling a point of time that the triangular-waveform oscillation signal Vosc has the maximum or minimum value.

The lighting apparatus may be powered on to perform an initialization operation in which the oscillation signal Vosc retains a predetermined level. Then, when the dimming control enable signal DIM_EN is enabled, the lighting apparatus may output the oscillation signal Vosc with a triangular waveform.

Before the frequency dithering enable signal JIT_EN is enabled, the oscillation signal Vosc has a uniform triangular waveform. That is, the oscillation signal Vosc at this time has an equal cycle T.

After the frequency dithering enable signal JIT_EN is enabled, one or more of the size and cycle of the triangular waveform of the oscillation signal Vosc may be changed by a magnitude change of the frequency reference voltage FREF through a change of the option information applied to the dithering resistor Rf or a cycle change of the frequency reference voltage FREF depending on a change of the dithering control signal DMOD.

The driving circuit 20 according to the present embodiment may store a plurality of values corresponding to the option information or dithering control signal DMOD in a storage area, and provide the option information or dithering control signal DMOD to regularly or irregularly change the frequency reference voltage REFF.

The dithering controller 300 of the driving circuit 20 may be configured to perform frequency dithering in a time including a first period in which a predetermined time elapses since the driving signal GATE is enabled and a second period from a predetermined time before the driving signal GATE is disabled to a point of time that the driving signal GATE is disabled.

The driving circuit 20 may periodically change the option information or dithering control signal DMOD, and provide the changed operation information or dithering control signal DMOD to the dithering controller 300 to perform frequency dithering on the driving signal GATE. Furthermore, the driving circuit 20 may change the option information or dithering control signal DMOD which has a pattern repeated on a basis of a plurality of cycles, and provide the changed operation information or dithering control signal DMOD to the dithering controller 300 to perform frequency dithering on the driving signal GATE. Furthermore, the driving circuit 20 may change the frequency reference voltage FREF by gradually varying the frequency, in order to perform frequency dithering.

Figure 9:
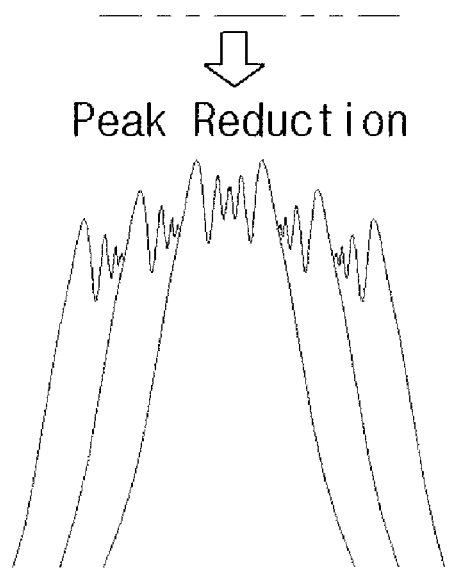
FIG. 9 is a waveform diagram illustrating a frequency-dithered driving signal.

As illustrated in FIG. 9, the frequency dithering on the driving signal GATE can reduce the peak of the driving signal GATE and spread the frequency of the driving signal GATE. Therefore, the converter 10 can spread the switching points for power conversion, thereby removing a concentration of power consumption while reducing EMI.

Figure 10:
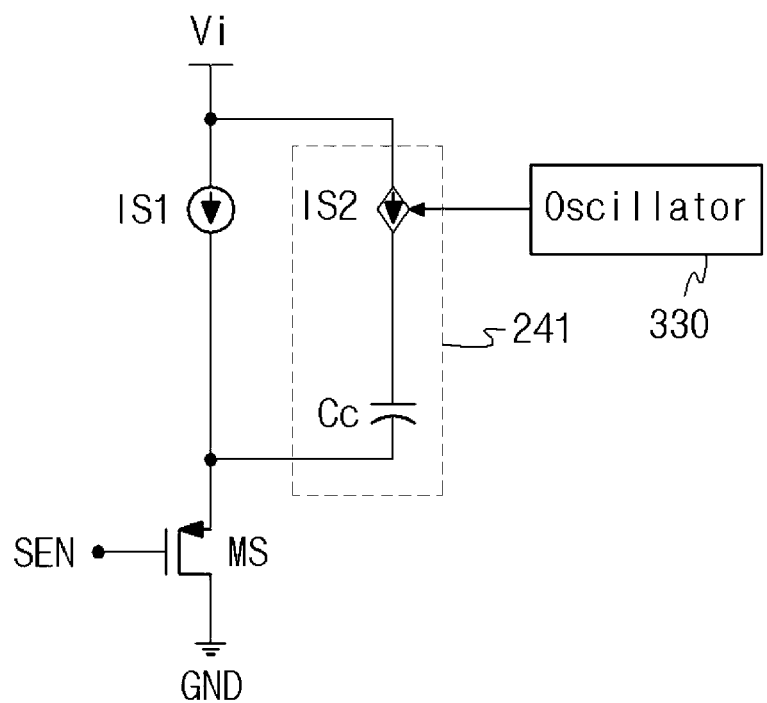
FIG. 10 is a circuit diagram illustrating a third embodiment of the present invention.

As illustrated in FIG. 10, the driving circuit 20 according to the present embodiment may include a slope compensator 241 configured to generate a slope compensation voltage as a value changed depending on the variable switching frequency of the converter 10.

In order that the slope compensation voltage is changed depending on the variable switching frequency of the converter 10, the driving circuit 20 is configured to use a frequency source that provides the changed frequency information of the driving signal GATE. The oscillator 330 that provides a PWM signal used for generating the driving signal GATE may be used as the frequency source. Furthermore, an output of the oscillator 330 may be used as the frequency information. More specifically, a voltage or current corresponding to the output of the oscillator 330 may be used as the frequency information.

The slope compensator 241 may include a dependent current source IS2 and a charging element Cc which are connected in series. The dependent current source IS2 may have a current amount controlled in response to the frequency information, and the charging element Cc may include a capacitor. The charging element Cc may be charged with a current provided from the dependent current source IS2, and provide the charged voltage as the slope compensation voltage.

The slope compensator 241 may be configured to generate the lower slope compensation voltage as the frequency of the driving signal GATE gets higher.

In FIG. 10, the current source IS1 and the PMOS transistor MS may correspond to the summer 242 of FIG. 2. FIG. 10 illustrates that the sensing signal SEN and the slope compensation voltage outputted from the slope compensator 241 are summed up. The summer 242 may not be limited to the configuration of FIG. 10, but embodied in various manners by a designer.

According to the configuration of FIG. 10, unstable sub-harmonic oscillation which occurs when the duty of the driving signal GATE provided to the converter 10 to generate an output voltage is equal to or more than 50% can be controlled by the slope compensator 241.

In order to vary the switching frequency of the converter 10, the frequency of the driving signal GATE needs to be varied. That is, the variation in switching frequency of the converter 10 depends on the variation in frequency of the driving signal GATE.

When the switching frequency is varied, the inductance value of the converter 10 is also changed. At this time, the value of the slope compensation voltage of the slope compensator 241 in FIG. 10 is also changed in response to the change of the inductance value.

More specifically, in order to vary the frequency of the driving signal GATE, the frequency of the PWM signal outputted from the oscillator 330 needs to be varied. Therefore, since the oscillator 330 has variable frequency information, the oscillator 330 may be used as the frequency source.

For example, the dependent current source IS2 may be configured to provide a current to the charging element Cc, the current being obtained by mirroring the output current of the oscillator 330. That is, the dependent current source IS2 may provide a current corresponding to the varied frequency of the PWM signal of the oscillator 330 to the charging element Cc in order to vary the frequency of the driving signal GATE. At this time, the current mirroring may be designed to decrease the current amount of the dependent current source IS2 when the frequency is raised to increase the output current of the oscillator 330, and increase the current amount of the dependent current source IS2 when the frequency is lowered to decrease the output current of the oscillator 330. The relation between the frequency of the oscillator 330 and the current amount of the dependent current source IS2 may be decided for the slope compensation to reduce the sub-harmonic oscillation.

Unlike the above-described configuration, the dependent current source IS2 may be configured to provide the PWM signal of the oscillator 330 or a current changed depending on a voltage corresponding to the PWM signal to the charging element Cc. At this time, the dependent current source IS2 may be configured to decrease the current amount according to the PWM signal of which the frequency is raised or the voltage corresponding to the PWM signal, or increase the current amount according to the PWM signal of which the frequency is lowered or the voltage corresponding to the PWM signal.

Figure 11:
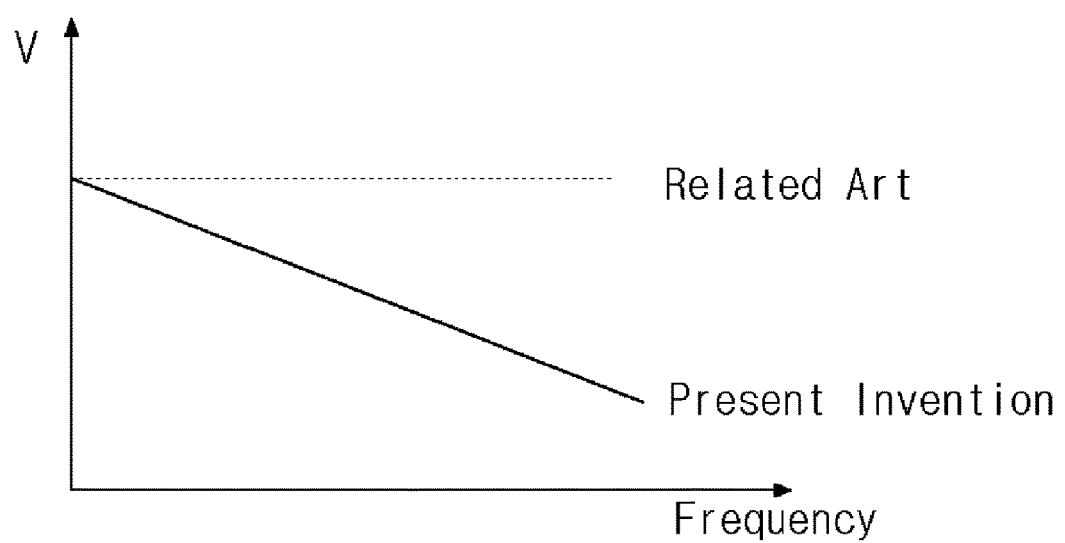
FIG. 11 is a graph illustrating a slope compensation voltage according to the third embodiment of the present invention.

The charging element Cc may be charged with the current provided from the dependent current source IS2, and the voltage stored in the charging element Cc may be provided as the slope compensation voltage. That is, the slope compensation voltage may be varied according to the frequency as illustrated in FIG. 11. FIG. 11 is a graph comparatively illustrating the slope compensation voltage of the lighting apparatus according to the embodiment of the present invention and the slope compensation voltage of the conventional lighting apparatus in which a voltage obtained through a fixed current is used as the slope compensation voltage.

Therefore, although the switching frequency of the converter 10 is varied, the lighting apparatus according to the present embodiment may provide the slope compensation voltage in connection with the frequency variation of the PWM signal outputted from the oscillator serving as the frequency source, without a separate terminal installed in the driving circuit 20 implemented with a chip or an additional circuit installed outside the chip.

Thus, according to the embodiment of the present invention, the function for actively handling the variation in switching frequency of the converter 10 can be simply implemented, while the number of parts and the manufacturing cost can be reduced.

Figure 12:
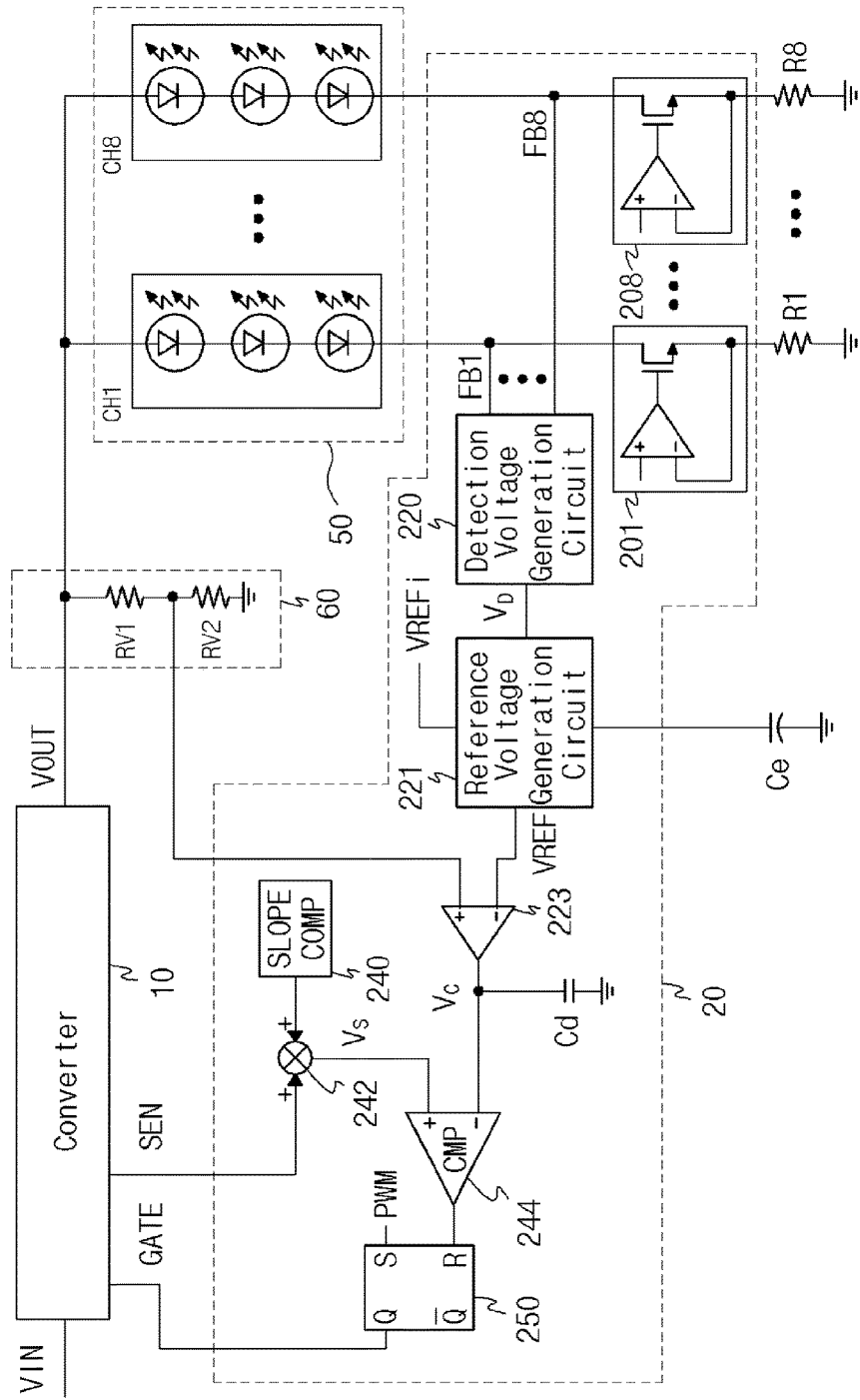
FIG. 12 is a circuit diagram illustrating a fourth embodiment of the present invention.

FIG. 12 illustrates a fourth embodiment for guaranteeing that each of the LED channels CH1 to CH8 included in the LED lamp 50 maintains a predetermined amount of LED current or more. In FIG. 12, the same components as those of FIG. 2 are represented by like reference numerals, and the duplicated descriptions of the configurations and operations thereof are omitted herein.

The lighting apparatus of FIG. 12 includes an output sensing circuit 60 for sensing the output voltage VOUT of the converter 10, and the output sensing circuit 60 includes resistors RV1 and RV2 connected in series. The resistors RV1 and RV2 are connected in parallel to an output terminal of the converter 10. The output sensing circuit 60 provides a voltage to the driving circuit 20, the voltage being applied to a node between the resistors RV1 and RV2 connected in series, and the voltage provided to the driving circuit 20 by the output sensing circuit 60 is referred to as an output sensing voltage. The output sensing circuit 60 may be configured inside or outside the driving circuit 20.

The driving circuit 20 may include linear regulators 201 to 208, a detection voltage generation circuit 220, a reference voltage generation circuit 221, a comparator 223, a capacitor Cd, a slope compensator 240, a summer 242, a comparator 244 and an SR latch 250.

The driving circuit of FIG. 12 includes the reference voltage generation circuit 221. The reference voltage generation circuit 221 is configured to receive an internal reference voltage VREFi and a detection voltage $V_D$ of the detection voltage generation circuit 220, use an external capacitor Ce, and output a reference voltage VREF to a negative terminal (−) of the comparator 223.

According to the above-described configuration, the reference voltage generation circuit 221 generates the reference voltage VREF of which the level rises when one or more of feedback voltages FB1 to FB8 corresponding to bias voltages of the respective LED channels LED1 to LED8 are equal to or less than the internal reference voltage VREFi having a preset value. Preferably, the reference voltage generation circuit 221 may be configured to generate the reference voltage VREF that rises until all of the feedback voltages FB1 to FB8 become equal to or more than the internal reference voltage VREFi. The reference voltage generation circuit 221 is configured to charge or discharge the external capacitor Ce.

The configuration of the reference voltage generation circuit 221 will be described later in more detail with reference to FIG. 13.

In the driving circuit 20 of FIG. 12, the comparator 223 is configured to compare the reference voltage VREF to the output sensing voltage of the output sensing circuit 60, and output a compensation voltage $V_c$. The reference voltage VREF is applied to the negative terminal (−) of the comparator 223, and the output sensing voltage of the output sensing circuit 60 is applied to the positive terminal (+) of the comparator 223.

Furthermore, in the driving circuit 20 of FIG. 12, the comparator 244 is configured to compare the compensation voltage $V_c$ to a comparison voltage $V_s$ of the summer 242, and output the comparison result. The compensation voltage $V_c$ is applied to the negative terminal (−) of the comparator 244, and the comparison voltage $V_s$ is applied to the positive terminal (+) of the comparator 244.

According to the above-described configuration, the SR latch 250 serving as a pulse generator generates a driving signal GATE in response to the output of the comparator 244, which has a level decided in response to the compensation voltage $V_c$. That is, the SR latch 25 generates the driving signal GATE of which the on-time is adjusted in response to the compensation voltage $V_c$, and provides the driving signal GATE to the converter 10 for power conversion.

Figure 13:
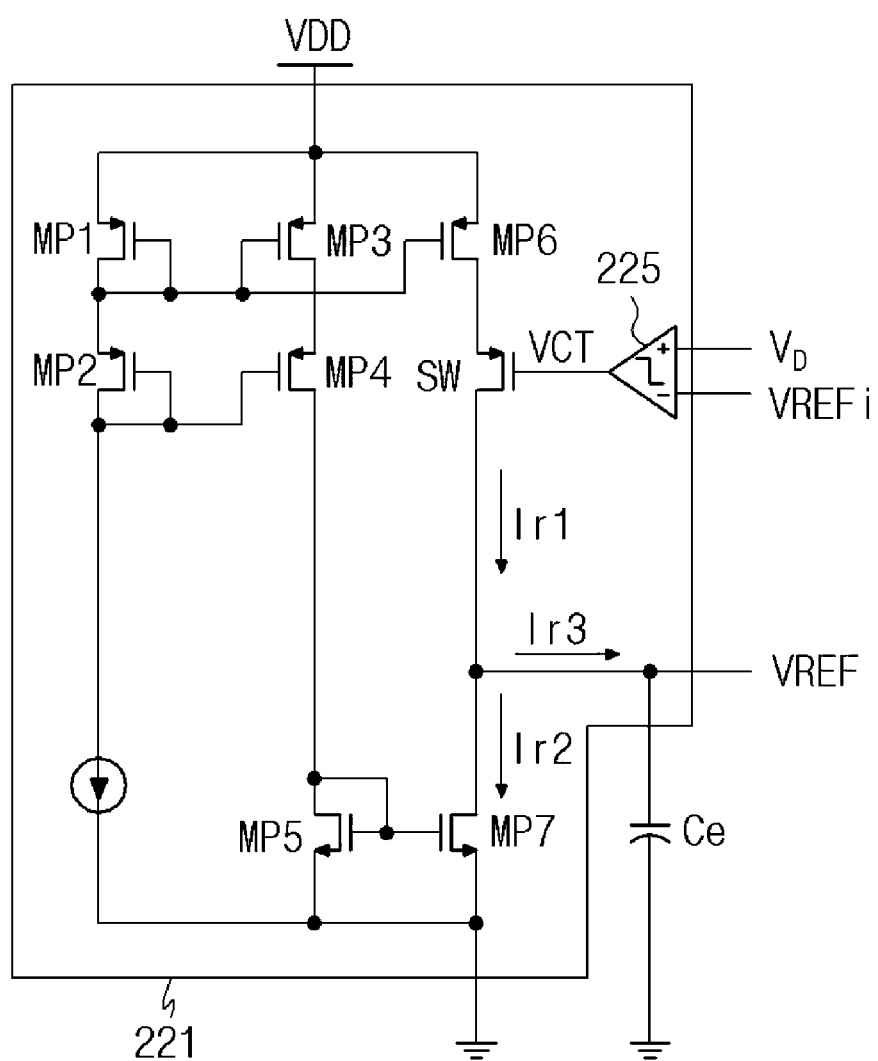
FIG. 13 is a circuit diagram illustrating a reference voltage generation circuit of FIG. 12.

Referring to FIG. 13, the configuration of the reference voltage generation circuit 221 will be described in more detail.

The reference voltage generation circuit 221 may charge or discharge the external capacitor Ce. The charging of the external capacitor Ce may be performed when one or more of the feedback voltages FB1 to FB8 are equal to or less than the internal reference voltage VREFi, and the discharging of the external capacitor Ce may be performed when all of the feedback voltages FB1 to FB8 become equal to or more than the internal reference voltage VREFi. The voltage stored in the capacitor Ce is outputted as the reference voltage VREF.

For this operation, the reference voltage generation circuit 221 includes a comparator 225 and a current control circuit. The comparator 225 outputs a switching control voltage VCT obtained by comparing the detection voltage $V_D$ and the internal reference voltage VREFi, and the current control circuit includes a switch SW which is switched according to the switching control voltage VCT. When the switch SW is turned on, the current control circuit provides a current for charging the capacitor Ce. The comparator 225 may output the switching control voltage VCT at a low level, for example, 0V when the detection voltage $V_D$ is lower than the internal reference voltage VREFi, and output the switching control voltage VCT at a high level, for example, a constant voltage VDD when the detection voltage $V_D$ is higher than the internal reference voltage VREFi. The switch SW is turned on when the switching control voltage VCT is at a low level, and turned off when the switching control voltage VCT is at a high level.

The current control circuit may further include a plurality of PMOS transistors MP1 to MP7 in order to control the operation of turning on the switch SW to provide a current to the capacitor Ce. The plurality of PMOS transistors MP1 to MP7 may be configured to have a current mirror structure for controlling the current provided to the capacitor Ce through the operation of the switch SW.

That is, the PMOS transistor MP1 and MP2 form a first path including a constant current source, the PMOS transistors MP3 to MP5 form a second path for providing a copied current, and the PMOS transistor MP6, the switch SW and the PMOS transistor MP7 form a third path for controlling the current provided to the capacitor Ce through the current of the second path. The transistors included in each of the first to third paths are connected in series, and the first to third paths are connected in parallel to the constant voltage VDD.

According to a resistance ratio (channel ratio) of the PMOS transistors MP3 and MP4 to the PMOS transistors MP1 and MP2, the amount of current flowing through the PMOS transistors MP3 and MP4 of the second path may be controlled based on the amount of current flowing through the PMOS transistors MP1 and MP2 of the first path. The amount of current flowing through the PMOS transistor MP6 may also be controlled based on the amount of current flowing through the PMOS transistor MP1 in the first path. The amount of current flowing through the PMOS transistor MP7 may also be controlled based on the amount of current flowing through the PMOS transistor MPS in the second path.

Figure 14:
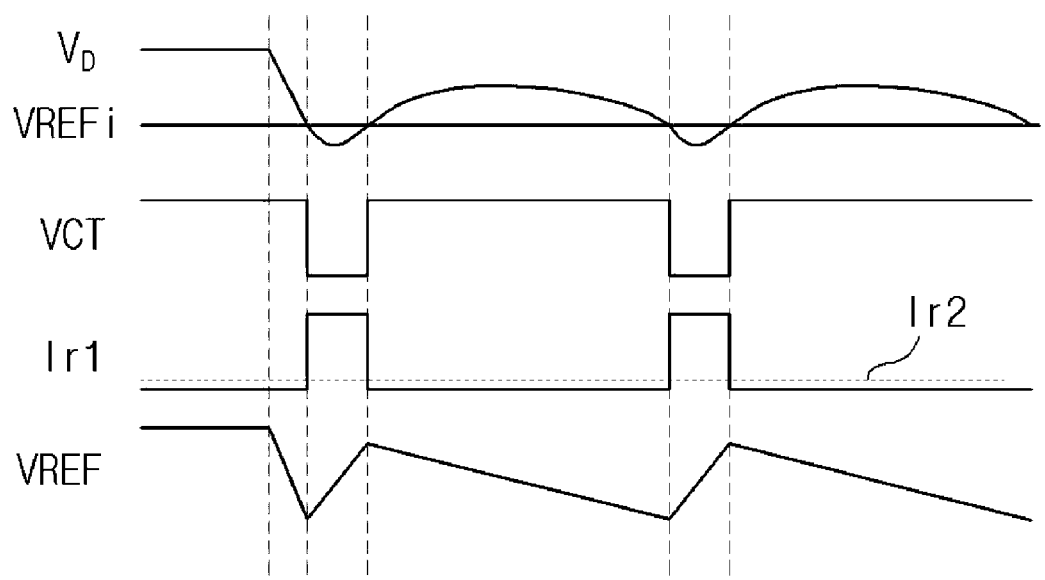
FIG. 14 is a waveform diagram illustrating voltages of the reference voltage generation circuit of FIG. 13.

The operation of the reference voltage generation circuit 221 having the configuration of FIG. 13 will be described with reference to FIG. 14.

In the reference voltage generation circuit 221, the switching control voltage VCT of the comparator 225 transitions to a low level when the detection voltage $V_D$ is lower than the internal reference voltage VREFi. As a result, the switch SW is turned on.

When the switch SW is turned on, a current flow Ir1 is started, and a current Ir3 is provided to the capacitor Ce, and the voltage of the capacitor Ce is raised by the charging with the current Ir3. The voltage stored in the capacitor Ce is the reference voltage VREF outputted from the reference voltage generation circuit 221. The amount of the current Ir3 may be set to "amount of current Ir1"-"amount of current in PMOS transistor MP7".

The detection voltage $V_D$ corresponds to the lowest feedback voltage among the feedback voltages FB1 to FB8. The switching control voltage VCT of the comparator 255 transitions to a high level when all of the feedback voltages FB1 to FB8 are equal to or more than the internal reference voltage VREFi. Therefore, until all of the feedback voltages FB1 to FB8 become equal to or more than the internal reference voltage VREFi, the capacitor Ce is charged with the reference voltage VREF while the level of the reference voltage VREF rises.

Then, when all of the feedback voltages FB1 to FB8 are equal to or more than the internal reference voltage VREFi, the switching control voltage VCT transitions to a high level, and the switch SW is turned off. When the switch SW is turned off, the current flow Ir1 is stopped.

The capacitor Ce is discharged after the current flow Ir1 is stopped. Thus, the level of the reference voltage VREF outputted to the reference voltage generation circuit 221 slowly decreases.

As described above, the reference voltage VREF provided from the reference voltage generation circuit 221 may increase or decrease according to the states of the feedback voltages FB1 to FB8.

When the reference voltage VREF increases, it may indicate that the amount of LED current needs to be compensated for in order for the LED channels CH1 to CH8 to normally emit light. At this time, the output voltage VOUT is raised by the increasing reference voltage VREF. When the reference voltage VREF decreases, it may indicate that the amount of LED current in each of the LED channels CH1 to CH8 can normally maintain light emission.

The series of processes in which the output voltage VOUT is raised by the increase of the reference voltage VREF will be described in more detail. When the reference voltage VREF increases, the comparator 223 compares the output sensing voltage of the output sensing circuit 60 to the increasing reference voltage VREF. When the comparison result indicates that the output sensing voltage of the output sensing circuit 60 is lower than the reference voltage VREF, the compensation voltage $V_c$ is applied at a negative level to the negative terminal (−) of the comparator 244. When the compensation voltage $V_c$ is applied at the negative level, the output of the comparator 244 rises. When the output of the comparator 244 rises, the SR latch 250 generates the driving signal GATE of which the on-time is increased. As a result, the output voltage VOUT of the converter 10 rises.

As described above, the output voltage VOUT is regulated to a predetermined level or more by the increasing reference voltage VREF.

In the fourth embodiment of the present invention, the output voltage VOUT may be regulated by the changed reference voltage VREF.

Therefore, the bias voltages of the LED channels CH1 to CH8 are different from each other due to a characteristic deviation therebetween, and the lowest feedback voltage among the feedback voltages of the LED channels CH1 to CH8 may be changed whenever each of the LED channels CH1 to CH8 emits light. The fourth embodiment of the present invention can stably retain the output voltage VOUT in response to the environment in which the lowest feedback voltage is changed, thereby preventing an occurrence of audible noise.

Figure 15:
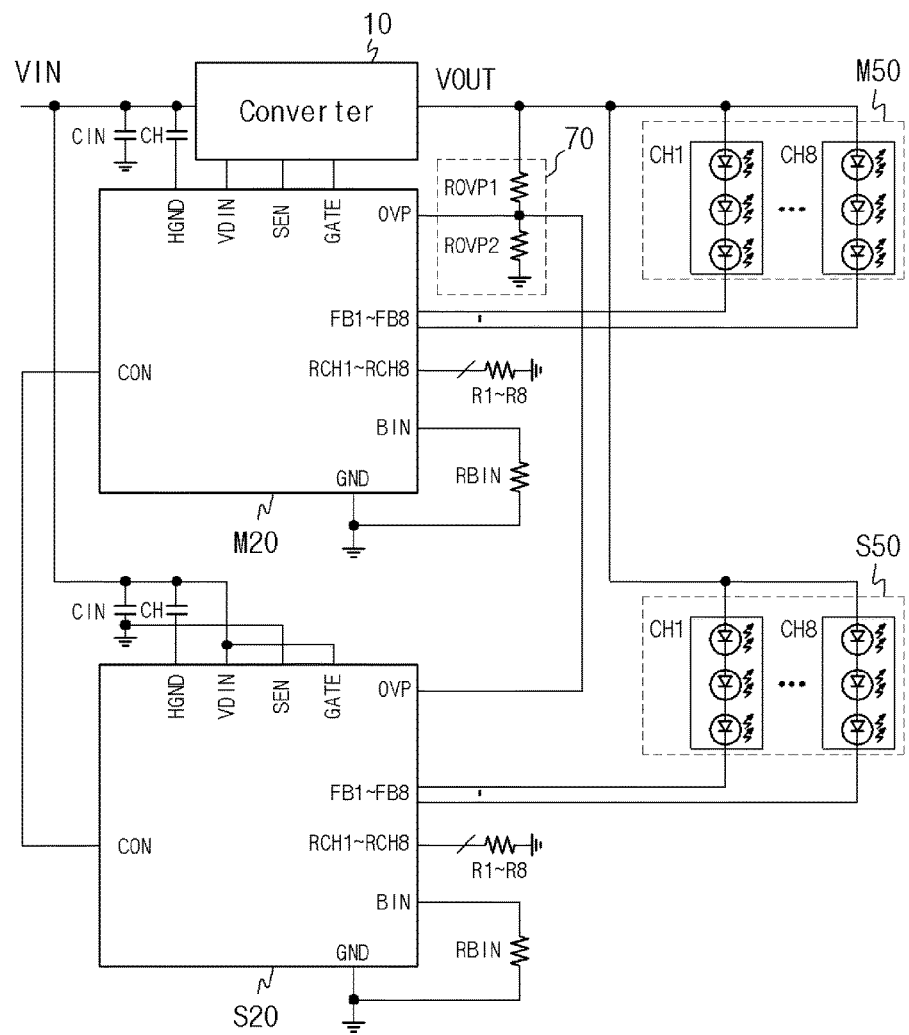
FIG. 15 is a block diagram illustrating a fifth embodiment of the present invention.

FIG. 15 illustrates a fifth embodiment of the present invention, in which parts of a converter and the like are shared in order to reduce the number of parts and the manufacturing cost.

Referring to FIG. 15, driving circuits are configured as multi-chips for one converter 10. In order to distinguish between the driving circuits, a driving circuit for providing the driving signal GATE to the converter 10 is referred to as a master driving circuit M20, and the other driving circuit is referred to as a slave driving circuit S20.

In the embodiment of FIG. 15, the converter 10 performs power conversion to output an output voltage VOUT corresponding to an input voltage VIN, and provides the output voltage VOUT to LED lamps M50 and S50.

Each of the LED lamps M50 and S50 includes a plurality of LED channels CH1 to CH8 configured in parallel to each other as illustrated in FIG. 1, and the plurality of LED channels CH1 to CH8 of the LED lamp emit light in response to the output voltage VOUT.

An overvoltage detection circuit 70 for detecting the level of the output voltage VOUT is installed at the output terminal of the converter 10. The overvoltage detection circuit 70 outputs a voltage as an overvoltage detection signal, the voltage being applied to a node between resistors ROVP1 and ROVP2 connected in series, and the overvoltage detection signal is shared by overvoltage detection terminals OVP of the master driving circuit M20 and the slave driving circuit S20.

When the overvoltage detection signal indicates that the output voltage VOUT corresponds to an overvoltage, the master driving circuit M20 may control the level of the output voltage VOUT or the light emission state of the LED lamp 50 by adjusting the output of the driving signal GATE. Furthermore, the slave driving circuit S20 may also control the light emission state of the LED lamp S50 in response to the overvoltage detection signal.

The master driving circuit M20 and the slave driving circuit S20 have the same configuration as the driving circuit 20 of FIG. 1, except that a shared terminal CON and a high ground terminal HGND. Therefore, the duplicated descriptions thereof are omitted herein. The master driving circuit M20 and the slave driving circuit S20 may use chips having the same structure.

The shared terminals CON of the master driving circuit M20 and the slave driving circuit S20 are electrically connected to each other. The high ground terminals HGND of the master driving circuit M20 and the slave driving circuit S20 are set in such a manner that a predetermined voltage is biased through the capacitor CH.

The master driving circuit M20 performs linear regulation on the LED channels CH1 to CH8 of the LED lamp M50, and detects a first minimum feedback voltage having the lowest level among the feedback voltage FB1 to FB8 of the LED channels CH1 to CH8 of the LED lamp 50. The master driving circuit M20 generates a detection voltage $V_D$ corresponding to the lower level between the first minimum feedback voltage and a second minimum feedback voltage shared through the shared terminal CON, generates the driving signal GATE in response to the detection voltage $V_D$, and provides the driving signal GATE to the converter 10 for power conversion. The configuration in which the master driving circuit M20 generates the driving signal GATE using the detection voltage $V_D$ can be implemented in various manners as described with reference to the embodiment of FIGS. 1 and 2 or the embodiment of FIG. 12. Thus, the detailed descriptions thereof are omitted herein.

The slave driving circuit S20 performs linear regulation on the LED channels CH1 to CH8 of the LED lamp S50, detects the second minimum feedback voltage having the lowest level among the feedback voltages of the LED channels CH1 to CH8 of the LED lamp S50, and shares the second minimum feedback voltage with the master driving circuit M20 through the shared terminal CON.

The slave driving circuit S20 includes input/output terminals related to the generation and output of the driving signal, like the master driving circuit M20. However, the slave driving circuit S20 does not generate and output the driving signal GATE. Therefore, terminals VIN, SEN and GATE of the input/output terminals of the slave driving circuit S20 are masked, the terminals VIN, SEN and GATE being related to the generation and output of the driving signal GATE. The masking may indicate that an input level is fixed by a high-level voltage stored in a capacitor CH or fixed to the ground level of a capacitor CIN, and include a floating state.

Figure 16:
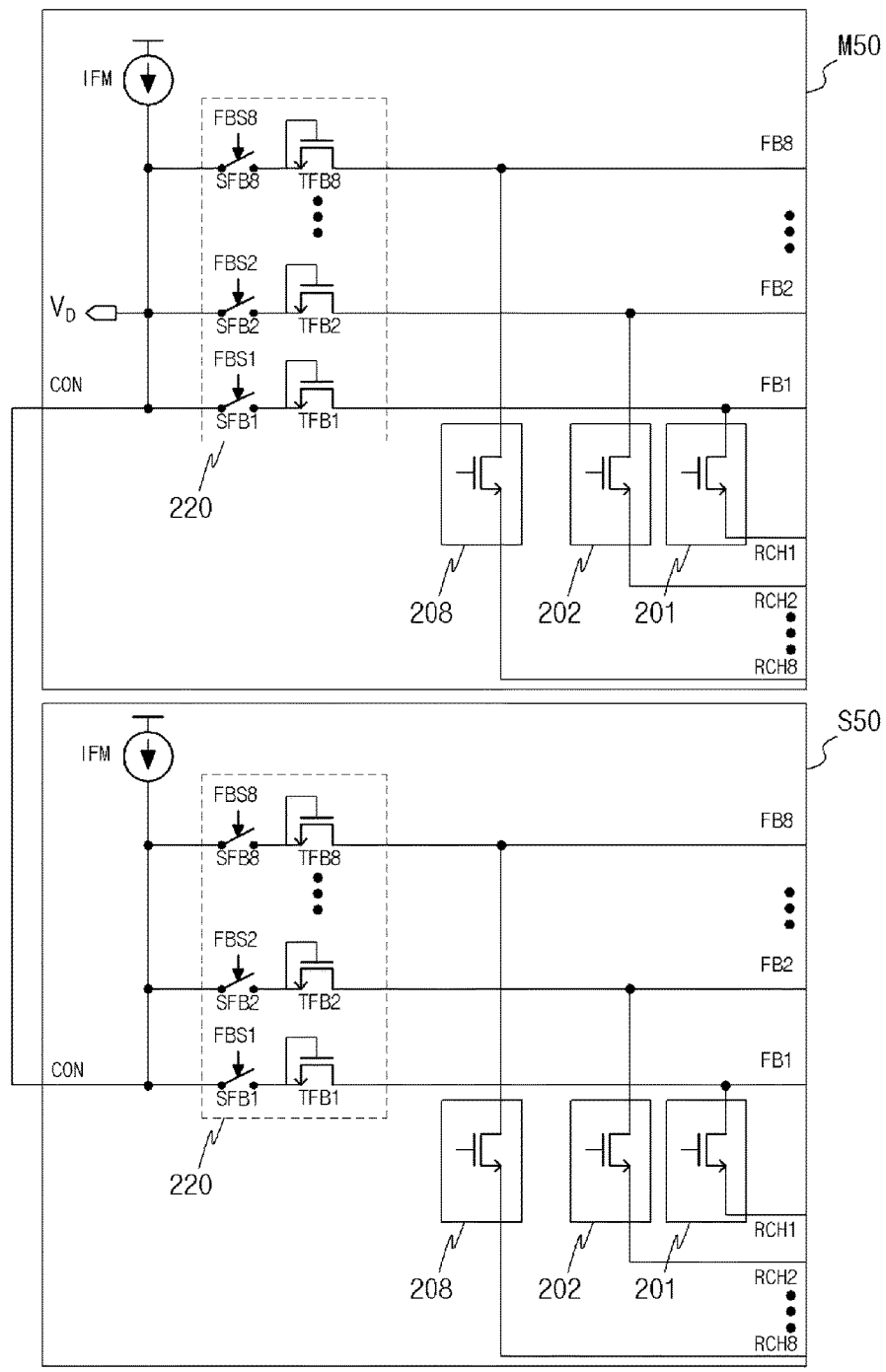
FIG. 16 is a circuit diagram illustrating linear regulators and voltage detection generation circuits of a master driving circuit and a slave driving circuit in FIG. 15.

Each of the master driving circuit M20 and the slave driving circuit S20 may include a detection voltage generation circuit 220 for generating the detection voltage $V_D$. The configuration and operation of the detection voltage generation circuit 220 included in each of the master driving circuit M20 and the slave driving circuit S20 will be described with reference to FIG. 16. FIG. 16 schematically illustrates the detection voltage generation circuits 220 and the linear regulators 201 to 208 of the master driving circuit M20 and the slave driving circuit S20.

The feedback voltages FB1 to FB8 of the master driving circuit M20 and the slave driving circuit S20 are applied to the respective linear regulators 201 to 208, respectively. Since the linear regulators 201 to 208 are configured in the same manner as FIG. 2, the descriptions of the configurations and operations of the linear regulators 201 to 208 are omitted herein.

The feedback voltages FB1 to FB8 are applied to the detection voltage generation circuits 220 in the master driving circuit M20 and the slave driving circuit S20.

The detection voltage generation circuit 220 included in each of the master driving circuit M20 and the slave driving circuit S20 may include transistors TFB1 to TFB8 and switches SFB1 to SFB8 for paths of the feedback voltages FB1 to FB8, respectively.

The transistors TFB1 to TFB8 transmit the feedback voltages FB1 to FB8 to the switches SFB1 to SFB8 when the switches SFB1 to SFB8 are turned on, and the switches SFB1 to SFB are switched by switching control signals FBS1 to FBS8, and transmit the feedback voltages FB1 to FB8 transmitted through the transistors TFB1 to TFB8 to an output terminal of the detection voltage generation circuit 220.

The output terminal of the detection voltage generation circuit 220 indicates a node to which the switches SFB1 to SFB8 are commonly connected to output the detection voltage $V_D$. As illustrated in FIG. 16, a constant current may be provided to the output terminal of the detection voltage generation circuit 220 by a constant current source.

The detection voltage generation circuit 220 may include a circuit (not illustrated) that compares the levels of the feedback voltages FB1 to FB8 and determines the lowest feedback voltage (minimum feedback voltage). The circuit provides the switching control signals FBS1 to FBS8 for outputting only the minimum feedback voltage as the detection voltage $V_D$. Since the circuit can be easily implemented with a comparator or level detector by those skilled in the art to which the present invention pertains, the detailed descriptions thereof are omitted herein.

The detection voltage generation circuit 220 may provide the switching control signals FBS1 to FBS8 for outputting only the minimum feedback voltage as the detection voltage $V_D$ to the switches SFB1 to SFB8.

For example, when the feedback voltage FB1 is determined to be the first minimum feedback voltage, the detection voltage generation circuit 220 of the master driving circuit M20 turns on only the switch SFB1, and turns off the other switches SFB2 to SFB8. As a result, the feedback voltage FB1 determined to be the first minimum feedback voltage may be transmitted to the output terminal of the detection voltage generation circuit 220 of the master driving circuit M20. The detection voltage generation circuit 220 of the slave driving circuit S20 may operate in the same manner as the detection voltage generation circuit 220 of the master driving circuit M20.

As described above, the detection voltage generation circuits 220 of the master driving circuit M20 and the slave driving circuit S20 may respectively transmit the first minimum feedback voltage and the second minimum feedback voltage to the output terminal.

The output terminals of the detection voltage generation circuits 220 of the master driving circuit M20 and the slave driving circuit S20 are electrically connected to each other through the shared terminals CON. Therefore, the first and second minimum feedback voltages transmitted to the output terminals of the detection voltage generation circuits 220 of the master driving circuit M20 and the slave driving circuit S20 are shared.

As a result, the detection voltage generation circuit 220 of the master driving circuit M20 may output the detection voltage $V_D$ generated through the sharing of the first and second minimum feedback voltages.

The master driving circuit M20 may generate the driving signal GATE in response to the generated detection voltage $V_D$, and provide the driving signal GATE to the converter 10 for power conversion, as described with reference to the embodiment of FIGS. 1 and 2 or the embodiment of FIG. 12.

The slave driving circuit S20 between the master driving circuit M20 and the slave driving circuit S20 may be configured to have only the functions of detecting the second minimum feedback voltage having the lowest level among the feedback voltages FB1 to FB8 of the LED channels CH1 to CH8 of the LED lamp S50 and performing linear regulation on the LED channels CH1 to CH8 of the LED lamp S50. In this case, the master driving circuit M20 may be referred to as a first circuit, and the slave driving circuit S20 may be referred to as a second circuit.

As described above, the driving circuits may be implemented with multi-chips corresponding to a large number of LED channels. Therefore, the lighting apparatus according to the embodiment of the present invention can share the lowest feedback voltage for the LED channels corresponding to the respective driving circuits, detect the lowest feedback voltage for the whole LED channels, and control the output voltage provided to the LED channels using the lowest feedback voltage for the whole LED channels.

As a result, the parts of the converter and the like can be shared. Therefore, the number of parts and the manufacturing cost can be reduced.

Figure 17:
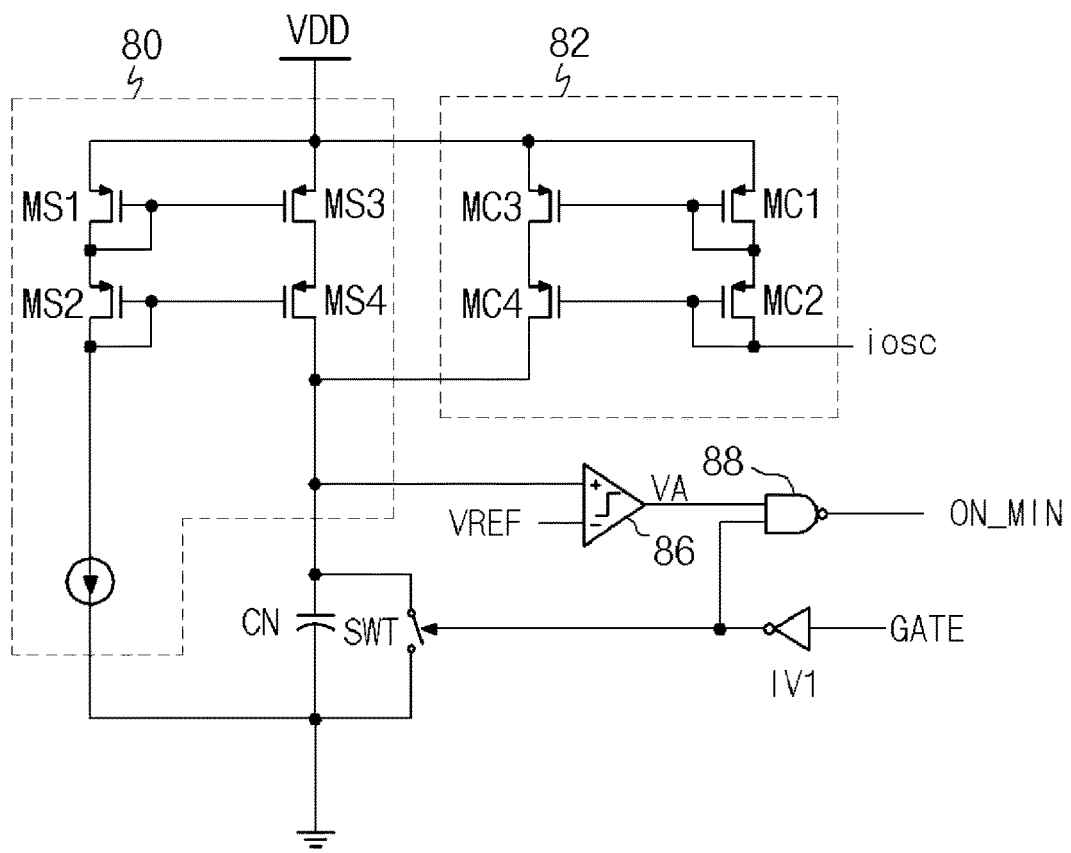
FIG. 17 is a circuit diagram illustrating a sixth embodiment of the present invention.
Figure 18:
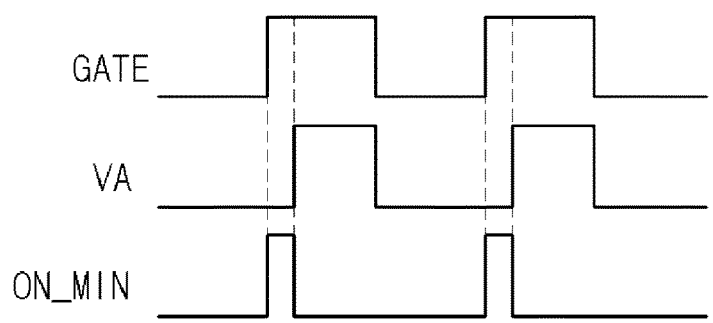
FIG. 18 is a waveform diagram for describing an operation of the embodiment of FIG. 17.
Figure 19:
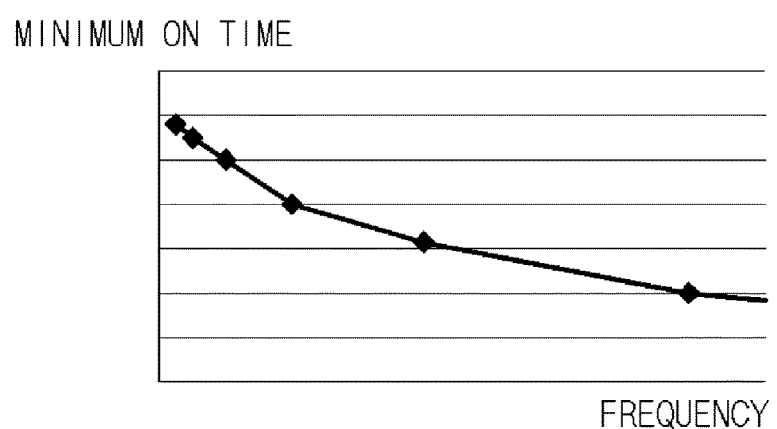
FIG. 19 is a graph illustrating a frequency change with respect to the minimum on-time according to the embodiment of FIG. 17.
Figure 20:
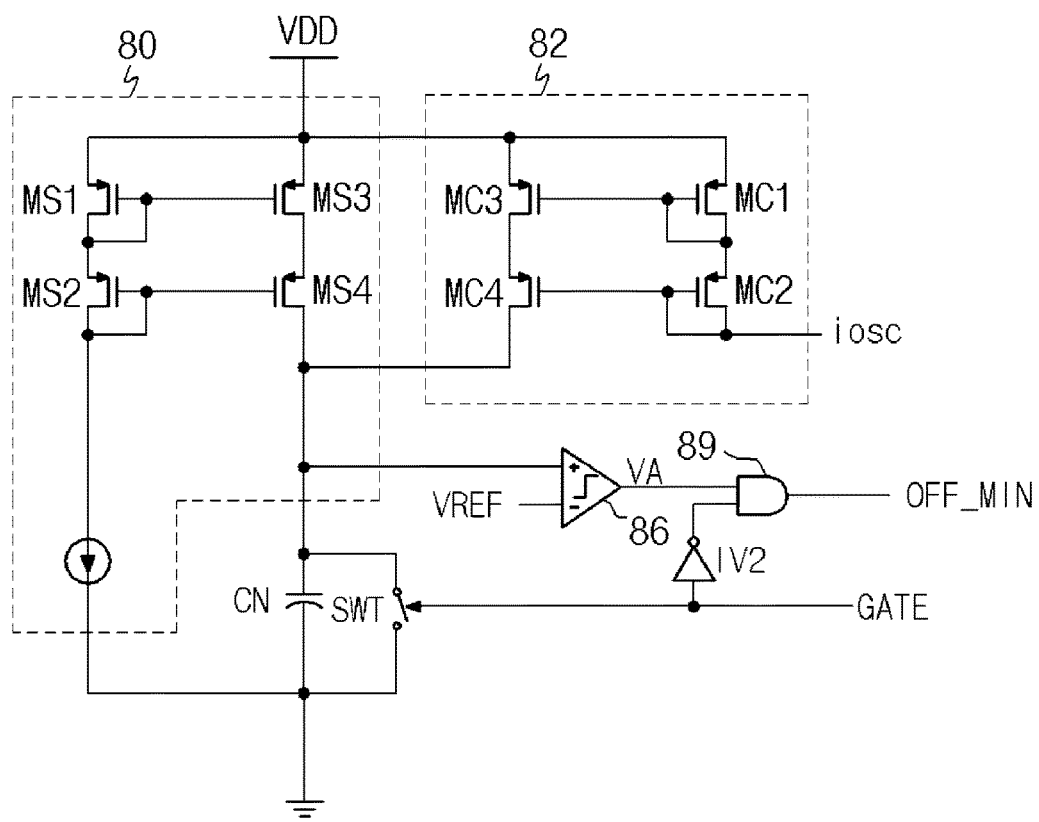
FIG. 20 is a circuit diagram illustrating a seventh embodiment of the present invention.
Figure 21:
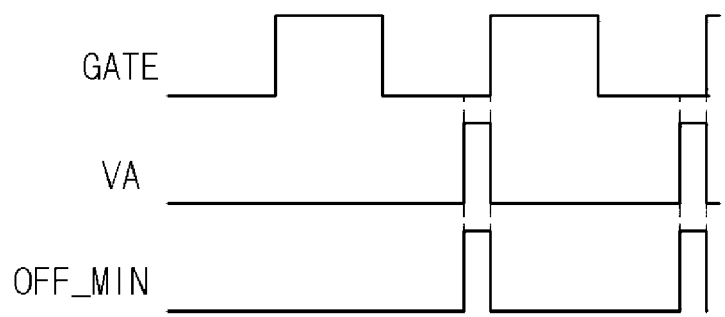
FIG. 21 is a waveform diagram for describing an operation of the embodiment of FIG. 20.
Figure 22:
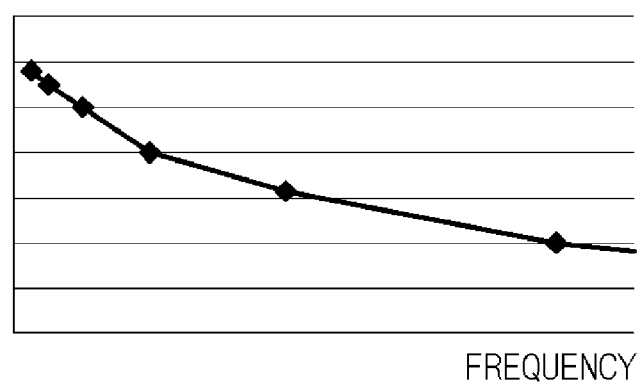
FIG. 22 is a graph illustrating a frequency change with respect to the minimum off-time according to the embodiment of FIG. 20.

The present invention may be embodied to secure an effective duty of the driving signal GATE for controlling dimming regardless of the switching frequency of the converter 10. For example, a sixth embodiment for guaranteeing the minimum on-time of the converter 10 regardless of the switching frequency of the converter 10 may be configured as illustrated in FIGS. 17 to 19. Furthermore, a seventh embodiment for guaranteeing the minimum off-time of the converter 10 regardless of the switching frequency of the converter 10 may be configured as illustrated in FIGS. 20 to 22.

First, the sixth embodiment will be described in detail with reference to FIGS. 17 to 19.

The driving circuit 20 may generate the driving signal GATE using the PWM signal of the oscillator 330. Since the configuration for generating the driving signal GATE using the PWM signal can be understood with reference to FIG. 2, the descriptions thereof are omitted herein. Hereafter, the PWM signal of the oscillator 330 will be referred to as an oscillation signal.

The switching frequency of the converter 10 may be decided by the driving signal GATE, and the driving circuit 20 may provide the driving signal GATE to the converter 10, the driving signal GATE capable of guaranteeing the minimum on-time of the converter 10.

As illustrated in FIG. 17, the driving circuit 20 may include a constant current supply unit 80, a control current supply unit 82, a charging element CN, a switch SWT, a comparator 86, a NAND gate 88 and an inverter IV1.

The constant current supply unit 80 serves to provide a constant current obtained through the constant voltage VDD to the charging element CN. For this operation, the constant current supply unit 80 is configured to copy a current flowing through PMOS transistors MS1 and MS2 connected in series into PMS transistors MS3 and MS4 through mirroring, and provide the current flowing through the PMOS transistors MS3 and MS4 to the charging element CN.

The control current supply unit 82, the charging element CN and the switch SWT are included in a control voltage generation circuit described later.

The control current supply unit 82 is configured to provide a control current to the charging element CN using an oscillator current iosc by an oscillation signal outputted from the oscillator 330. For this operation, the control current supply unit 82 includes PMOS transistors MC1 and MC2 connected in series to pass a current corresponding to the oscillator current iosc, and PMOS transistors MC3 and MC4 connected in series to pass a current obtained by copying the current flowing through the PMOS transistor MC1 and MC2 through mirroring. The current flowing through the PMOS transistors MC3 and MC4 is provided to the charging element CN.

The amount of the oscillator current iosc may be changed in proportion to a frequency change of the oscillation signal. Therefore, the amount of the control current provided to the charging element CN by the control current supply unit 82 may also be changed in proportion to the frequency change of the oscillation signal.

More specifically, when the oscillation signal has a high frequency, the amount of the oscillator current iosc is increased, and the amount of the control current of the control current supply unit 82 is also increased. On the other hand, when the oscillation signal has a low frequency, the amount of the oscillator current iosc is decreased, and the amount of the control current of the control current supply unit 82 is also decreased.

The switch SWT is connected in parallel to the charging element CN, and turned on to block a current supply to the charging element CN. That is, the current supply to the charging element CN is regulated by the switch SWT. The switch SWT is switched by the driving signal GATE which is inverted and inputted through the inverter IV1. That is, the switch SWT is turned off while the converter 10 is turned on, and turned on while the converter 10 is turned off. Therefore, the charging element CN is charged while the converter 10 is turned on, and discharged while the converter 10 is turned off.

The charging element CN may be charged with the current supplied by the constant current supply unit 80 and the control current supply unit 82, and generate a control voltage. In particular, the charging element CN may generate the control voltage according to the control current of the control current supply unit 82, which is changed in response to a frequency change of the oscillation signal, and the charging speed of the control voltage may be changed in proportion to the frequency change of the oscillation signal.

More specifically, when the oscillation signal has a high frequency, the amount of the control current of the control current supply unit 82 is increased, and the charging speed of the control voltage increases. On other hand, when the oscillation signal has a low frequency, the amount of the control current of the control current supply unit 82 is decreased, and the charging speed of the control voltage decreases.

The comparator 86 compares the control voltage of the charging element CN, applied to a positive terminal (+) thereof, to the reference voltage VREF applied to a negative terminal (−) thereof, and outputs a control pulse VA as illustrated in FIG. 18. More specifically, the comparator 86 outputs the control pulse VA that transitions to a high level when the control voltage reaches the reference voltage VREF, and maintains the transition state while the control voltage is retained at the reference voltage VREF or more. The comparator 86 that performs the above-described operation corresponds to a control pulse generation circuit described later.

When the frequency of the oscillation signal is so high that the capacitor CN is rapidly charged with the control voltage, the comparator 86 outputs the control pulse VA of which the level transition point is early. On the other hand, when the frequency of the oscillation signal is so low that the capacitor CN is slowly charged with the control voltage, the comparator 86 outputs the control pulse VA of which the level transition point is late.

The NAND gate 88 performs a NAND operation on the control pulse VA and the inverted driving signal GATE, and outputs the minimum on-time pulse as illustrated in FIG. 18. The inverted driving signal GATE is used for determining the turn-on period of the converter 10.

In other words, the NAND gate 88 generates a minimum on-time pulse ON_MIN using the control pulse VA within the turn-on period of the converter 10, the minimum on-time pulse ON_MIN defining the minimum on-time from the turn-on start point of the converter 10 to the end point of the minimum on-time. The NAND gate 88 performing the above-described operation corresponds to a minimum on-time determination unit described later.

When the frequency of the oscillation signal is so high that the comparator 86 outputs the control pulse VA of which the level transition point is early, the end point of the minimum on-time is put forward. As a result, the NAND gate 88 outputs the minimum on-time pulse ON_MIN with a narrow pulse width. On the other hand, when the frequency of the oscillation signal is so low that the comparator 86 outputs the control pulse VA of which the level transition point is late, the end point of the minimum on-time is delayed. As a result, the NAND gate 88 outputs the minimum on-time pulse ON_MIN with a wide pulse width.

That is, the embodiment of FIG. 17 may adjust the width of the minimum on-time pulse ON_MIN in response to the frequency change of the oscillation signal as illustrated in FIG. 19. The width of the minimum on-time pulse ON_MIN indicates the minimum on-time which can be guaranteed for a turn-on of the converter 10. In other words, the minimum on-time for a turn-on of the converter 10 may be changed in response to the frequency change of the oscillation signal.

Therefore, the embodiment of FIGS. 17 to 19 can secure an effective duty for controlling dimming regardless of the switching frequency of the converter 10.

The embodiment of FIG. 17 may include an end point generation unit and a minimum on-time determination unit.

The end point generation unit is configured to generate the control pulse VA using the oscillation signal used for generating the driving signal GATE within a turn-on period of the converter 10, the control pulse VA indicating the end point of the minimum on-time following a frequency change of the oscillation signal.

The end point generation unit may include a control voltage generation circuit and a control pulse generation circuit.

The control voltage generation circuit is configured to generate a control voltage using the oscillation signal used for generating signal GATE within the turn-on period of the converter 10, the control voltage having a rising time that is changed according to the frequency change of the oscillation signal. The control pulse generation circuit corresponds to the above-described comparator 86.

The control voltage generation circuit may include a control current supply unit 82, a charging element CN and a switch SWT.

The seventh embodiment will be described in detail with reference to FIGS. 20 to 22.

The embodiment of FIG. 20 may guarantee the minimum off-time of the converter 10 regardless of the switching frequency of the converter 10, and the driving circuit 20 may provide the driving signal GATE to the converter 10, the driving signal GATE capable of guaranteeing the minimum off-time of the converter 10.

As illustrated in FIG. 20, the driving circuit 20 may include a constant current supply unit 80, a control current supply unit 82, a charging element CN, a switch SWT, a comparator 86, an AND gate 89 and an inverter IV2.

The embodiment of FIG. 20 is different from the embodiment of FIG. 17 in that the AND gate 89 and the inverter IV2 are installed in place of the NAND gate 88 and the inverter IV1, and the charging element CN has a different charge capacity. Since the other components of FIG. 20 are configured in the same manner as those of FIG. 17, the duplicated descriptions thereof are omitted herein.

In FIG. 20, the switch SWT is switched by the driving signal GATE which is non-inverted and inputted. That is, the switch SWT is turned off while the converter 10 is turned off, and turned on while the converter 10 is turned on. Therefore, the charging element CN is charged while the converter 10 is turned off, and discharged while the converter 10 is turned on.

The charging element CN may have a larger charge capacity than that of FIG. 17.

The comparator 86 outputs the control pulse VA as illustrated in FIG. 21. More specifically, in the embodiment of FIG. 20, a time required for the control voltage to reach the reference voltage VREF is later than in the embodiment of FIG. 17, due to the difference in charge capacity between the charging elements CN. Therefore, the control pulse VA outputted from the comparator 86 transitions at a predetermined time after the turn-off period of the converter 10 is started. The transition level is retained until the turn-on period of the converter 10 is started. The comparator 86 outputs the control pulse VA that maintains the transition state while the control voltage is retained at the reference voltage VREF or more.

The AND gate 89 performs an AND operation on the control pulse VA and the inverted driving signal GATE, and outputs the minimum off-time pulse as illustrated in FIG. 21. The inverted driving signal GATE is used for determining the turn-off period of the converter 10.

That is, the AND gate 89 generates a minimum off-time pulse OFF_MIN using the control pulse VA within the turn-off period of the converter 10, the minimum off-time pulse OFF_MIN defining the minimum off-time from the start point of the minimum off-time to the turn-off end point of the converter 10. The AND gate 89 performing the above-described operation corresponds to a minimum off-time determination unit described later.

When the frequency of the oscillation signal is so high that the comparator 86 outputs the control pulse VA of which the level transition point is early, the start point of the minimum off-time is put forward. As a result, the AND gate 89 outputs the minimum off-time pulse OFF_MIN with a wide pulse width. On the other hand, when the frequency of the oscillation signal is so low that the comparator 86 outputs the control pulse VA of which the level transition point is late, the start point of the minimum off-time is delayed. As a result, the AND gate 89 outputs the minimum off-time pulse OFF_MIN with a narrow pulse width.

That is, the embodiment of FIG. 20 may adjust the width of the minimum off-time pulse OFF_MIN in response to the frequency change of the oscillation signal as illustrated in FIG. 22. The width of the minimum off-time pulse OFF_MIN indicates the minimum off-time which can be guaranteed for a turn-off of the converter 10. In other words, the minimum off-time for the turn-off of the converter 10 may be changed in response to the frequency change of the oscillation signal.

Therefore, the embodiment of FIGS. 20 to 22 can secure an effective duty for controlling dimming regardless of the switching frequency of the converter 10.

The embodiment of FIG. 20 may include a start point generation unit and a minimum off-time determination unit.

The start point generation unit is configured to generate the control pulse VA using the oscillation signal used for generating the driving signal GATE within the turn-off period of the converter 10, the control pulse VA indicating the start point of the minimum off-time following the frequency change of the oscillation signal.

The start point generation unit may include a control voltage generation circuit and a control pulse generation circuit.

The control voltage generation circuit is configured to generate a control voltage using the oscillation signal used for generating signal GATE within the turn-off period of the converter 10, the control voltage having a rising time that is changed according to the frequency change of the oscillation signal. The control pulse generation circuit corresponds to the comparator 86.

The control voltage generation circuit may include a control current supply unit 82, a charging element CN and a switch SWT.

The embodiment of FIG. 17 and the embodiment of FIG. 20 may be simultaneously applied to the driving circuit 20. In this case, the minimum on-time of the turn-on period and the minimum off-time of the turn-off period in the converter 10 can be guaranteed at the same time, regardless of the switching frequency.

While various embodiments have been described above, it will be understood to those skilled in the art that the embodiments described are by way of example only. Accordingly, the disclosure described herein should not be limited based on the described embodiments.

What is claimed is:

1. A lighting apparatus that provides an output voltage to a lighting load, comprising:
   a converter configured to generate the output voltage using a driving signal; and
   a driving circuit configured to provide the driving signal, and spread the frequency of the driving signal by performing frequency dithering on the driving signal while changing the shape of an oscillation signal.

2. The lighting apparatus of claim 1, wherein the driving circuit stores a value for controlling one or more of the height and cycle of the oscillation signal, and regularly or irregularly changes the shape of the oscillation signal.

3. The lighting apparatus of claim 1, wherein the driving circuit performs the frequency dithering in a time including one or more of a first period in which a predetermined time elapses since the driving signal is enabled and a second period from a predetermined time before the driving signal is disabled to a point of time that the driving signal is disabled.

4. The lighting apparatus of claim 1, wherein the driving circuit periodically performs the frequency dithering to change the shape of the oscillation signal.

5. The lighting apparatus of claim 4, wherein the driving circuit changes the shape of the oscillation signal which has a pattern repeated on a basis of a plurality of cycles.

6. The lighting apparatus of claim 5, wherein the driving circuit performs the frequency dithering by gradually varying the frequency of the oscillation signal.

7. The lighting apparatus of claim 6, wherein the driving circuit performs the frequency dithering by periodically changing the cycle of the oscillation signal.

8. The lighting apparatus of claim 1, wherein the driving circuit generates the oscillation signal in a triangular waveform, and performs the frequency dithering by changing one or more of the height and cycle of the triangular waveform.

9. The lighting apparatus of claim 1, wherein the driving circuit performs the frequency dithering to change the frequency of the driving signal in a range of 30% based on non-dithering.

10. A driving circuit of a lighting apparatus, which provides a driving signal to a converter for providing an output voltage to lighting loads, the driving circuit comprising:
    a dithering control unit configured to generate a frequency reference voltage which the waveform is changed;
    a filter configured to provide an oscillation signal obtained by standardizing the shape of the frequency reference voltage; and
    an oscillator configured to provide a frequency-dithered pulse in response to the shape of the oscillation signal, wherein the driving circuit spreads the frequency of the driving signal in response to the frequency-dithered pulse.

11. The driving circuit of claim 10, wherein the dithering control unit changes the shape of the frequency reference voltage in a time including one or more of a first period in which a predetermined time elapses since the driving signal is enabled and a second period from a predetermined time before the driving signal is disabled to a point of time that the driving signal is disabled.

12. The driving circuit of claim 10, wherein the dithering control unit changes the shape of the frequency reference voltage which has a pattern repeated on a basis of a plurality of cycles.

13. The driving circuit of claim 10, wherein the dithering control unit generates the frequency reference voltage in a triangular waveform having a plurality of steps, and periodically changes the maximum value of the triangular waveform.

14. The driving circuit of claim 13, wherein the dithering control unit periodically changes the cycle of the triangular waveform of the frequency reference voltage.

15. The driving circuit of claim 10, wherein the dithering control unit changes the shape of the frequency reference voltage in a range of 30% based on non-dithering.

16. A driving circuit of a lighting apparatus, which provides a driving signal to a converter for providing an output voltage to illumination loads, the driving circuit comprising:
- a frequency source configured to provide variable frequency information of the driving signal; and
- a slope compensator configured to generate a slope compensation voltage having a value changed depending on the frequency information,
- wherein the driving circuit provides the driving signal having a slope corresponding to the slope compensation voltage.

17. The driving circuit of claim 16, wherein an oscillator to provide a pulse width modulation (PWM) signal for the driving signal is used as the frequency source.

18. The driving circuit of claim 17, wherein the frequency information is a voltage or current corresponding to an output of the oscillator.

19. The driving circuit of claim 16, wherein the slope compensator comprises:
- a dependent current source having a current amount controlled in response to the frequency information; and
- a charging element configured to be charged with a current provided from the dependent current source, and provide a charged voltage as the slope compensation voltage.

20. The driving circuit of claim 16, wherein the slope compensator generates the slope compensation voltage which decreases as the frequency of the driving signal becomes higher.

21. The driving circuit of claim 16, further comprising:
- a summer configured to sum up the slope compensation voltage and a sensing signal obtained by sensing the output voltage, and output the sum result as a comparison voltage; and
- a pulse generator configured to generate the driving signal by reflecting the comparison voltage of the summer, and provide the driving signal to the converter.

22. A driving circuit of a lighting apparatus, which provides a driving signal to a converter for providing an output voltage to illumination loads, the driving circuit comprising:
- a dependent current source having a current amount controlled in response to an output state of an oscillator that decides the frequency of the driving signal; and
- a charging element configured to be charged with a current provided by the dependent current source and provide a charged voltage as a slope compensation voltage,
- wherein the driving circuit provides the driving signal having a slope corresponding to the slope compensation voltage.

23. The driving circuit of claim 22, wherein the current amount of the dependent current source is controlled to decrease as the frequency of the driving signal becomes higher.

24. The driving circuit of claim 22, further comprising:
- a summer configured to sum up the slope compensation voltage and a sensing signal obtained by sensing the output voltage, and output the sum result as a comparison voltage; and
- a pulse generator configured to generate the driving signal by reflecting the comparison voltage of the summer, and provides the driving signal to the converter.

* * * * *